(12) United States Patent
Xu et al.

(10) Patent No.: US 12,206,692 B2
(45) Date of Patent: *Jan. 21, 2025

(54) MALWARE DETECTION USING WATERMARK COOKIES

(71) Applicant: Palo Alto Networks, Inc., Santa Clara, CA (US)

(72) Inventors: Zhaoyan Xu, Union City, CA (US); Wei Xu, Cupertino, CA (US); Kyle Sanders, Sunnyvale, CA (US)

(73) Assignee: Palo Alto Networks, Inc., Santa Clara, CA (US)

( * ) Notice: Subject to any disclaimer, the term of this patent is extended or adjusted under 35 U.S.C. 154(b) by 450 days.

This patent is subject to a terminal disclaimer.

(21) Appl. No.: 17/710,886

(22) Filed: Mar. 31, 2022

(65) Prior Publication Data

US 2022/0224708 A1 Jul. 14, 2022

Related U.S. Application Data

(63) Continuation of application No. 16/706,501, filed on Dec. 6, 2019, now Pat. No. 11,323,466, which is a continuation of application No. 15/141,739, filed on Apr. 28, 2016, now Pat. No. 10,547,627.

(60) Provisional application No. 62/305,464, filed on Mar. 8, 2016.

(51) Int. Cl.
*H04L 9/40* (2022.01)

(52) U.S. Cl.
CPC ...... *H04L 63/1425* (2013.01); *H04L 63/1441* (2013.01); *H04L 63/0254* (2013.01)

(58) Field of Classification Search
CPC ............. H04L 63/1425; H04L 63/1441; H04L 63/0254

USPC .......................................................... 726/23
See application file for complete search history.

(56) References Cited

U.S. PATENT DOCUMENTS

| 8,312,543 | B1 | 11/2012 | Gardner |
| 8,739,284 | B1 | 5/2014 | Gardner |
| 8,763,120 | B1 | 6/2014 | Forristal |
| 8,856,869 | B1 | 10/2014 | Brinskelle |

(Continued)

OTHER PUBLICATIONS

Afonso et al., 2012 IEEE ICC, Communication and Information Systems Security Symposium, "A Hybrid Framework to Analyze Web and OS Malware" pp. 966-970 (Year: 2012).*

(Continued)

*Primary Examiner* — Khalil Naghdali
(74) *Attorney, Agent, or Firm* — Van Pelt, Yi & James LLP

(57) ABSTRACT

Techniques for malware detection using watermark cookies are disclosed. In some embodiments, a system, process, and/or computer program product for malware detection using watermark cookies includes receiving a sample at a cloud security service; injecting a watermark cookie in a virtual environment to provide a modified virtual environment; detonating the sample in the modified virtual environment, wherein the modified virtual environment is instrumented for monitoring activities associated with the sample during automated malware analysis of the sample; detecting whether the watermark cookie was accessed in the modified virtual environment during the automated malware analysis of the sample; and determining whether the sample is malware based on whether the watermark cookie was accessed in the modified virtual environment.

20 Claims, 15 Drawing Sheets

(56) References Cited

U.S. PATENT DOCUMENTS

| | | | |
|---|---|---|---|
| 9,495,188 | B1 | 11/2016 | Ettema |
| 9,727,534 | B1 | 8/2017 | Buddhiraja |
| 9,769,199 | B2 | 9/2017 | Kashyap |
| 9,860,208 | B1 | 1/2018 | Ettema |
| 9,882,929 | B1 | 1/2018 | Ettema |
| 9,916,443 | B1 | 3/2018 | Qu |
| 9,922,192 | B1 | 3/2018 | Kashyap |
| 10,044,675 | B1 | 8/2018 | Ettema |
| 10,972,488 | B2 * | 4/2021 | Pal ................. H04L 63/1441 |
| 2008/0209557 | A1 | 8/2008 | Herley |
| 2011/0078794 | A1 | 3/2011 | Manni |
| 2012/0240185 | A1 | 9/2012 | Kapoor |
| 2012/0297457 | A1 | 11/2012 | Schulte |
| 2013/0160120 | A1 | 6/2013 | Malaviya |
| 2015/0220735 | A1 | 8/2015 | Paithane |
| 2017/0147819 | A1 | 5/2017 | Vasilenko |

OTHER PUBLICATIONS

Thomas et al., 2015 IEEE Symposium on Security and Privacy, "Ad Injection at Scale: Assessing Deceptive Advertisement Modifications", pp. 151-167 (Year: 2015).*

A. Barth, HTTP State Management Mechanism, RFC 6265, Apr. 2011.

Author Unknown, All You Need to Know About Cookies, Cookiepedia, retrieved from https://web.archive.org/web/20160219192720/https://cookiepedia.co.uk/ on Feb. 19, 2016.

Author Unknown, HTTP cookie, from Wikipedia, the free encyclopedia, retrieved from https://web.archive.org/web/20160304204942/https://en.wikipedia.org/wiki/HTTP_cookie on Mar. 4, 2016.

Author Unknown, Longest common subsequence problem, Wikipedia, the free encyclopedia, retrieved from https://en.wikipedia.org/w/index.php?title=Longest_common_subsequence_problem&oldid=705643333 on Apr. 22, 2016.

Author Unknown, Session hijacking attack, from OWASP, retrieved from http://www.owasp.org/index.php?title=Session_hijacking_attack&oldid=18580 last modified Aug. 14, 2014.

Author Unknown, VirusTotal, Free Online Virus, Malware, and URL Scanner, retrieved from https://web.archive.org/web/2016030706144/https://www.virustotal.com/ on Mar. 7, 2016.

Author Unknown, WildFire, Protection from Targeted and Unknown Malware, retrieved from https://web.archive.org/web/20150906054124/https://www.paloaltonetworks.com/products/technologies/wildfire.html, Sep. 6, 2015.

Erik Romijn, The definitive guide to cookie domains and why a www-prefix makes your website safer, retrieved from http://erik.io/blog/2014/03/04/definitive-guide-to-cookie-domains/ published on Mar. 4, 2014.

Grobert et al., Software Distribution as a Malware Infection Vector, 2009. Institute of Electrical and Electronics Engineers.

Xu et al., Toward Worm Detection in Online Social Networks, ACSAC '10 Proceedings of the 26th Annual Computer Security Applications Conference, Dec. 2010.

Zarras et al., Automated Generation of Models for Fast and Precise Detection of HTTP-Based Malware, 2014 Twelfth Annual Conference on Privacy, Security and Trust (PST).

* cited by examiner

Cookies Preprocessing

| Category | Description | Label |
|---|---|---|
| 1 | All characters are lower-case letters | 0001 |
| 2 | All characters are upper-case letters | 0010 |
| 3 | All characters are mix-ins with lower and upper case letters | 0011 |
| 4 | All characters are all digits | 0100 |
| 5 | All characters are mix-ins with letters and digits | 0111 |

Table I: Exemplary Labels for Cookies.

FIG. 6A

| Item | I | II |
|---|---|---|
| Accuracy | 89.22% | 43.37% |
| False Positive | 0.27% | 0.13% |

Table 2: Detection Results on a Test Data Set.

FIG. 6B

Cookies Processing for Clustering

802

| Platform | Cookies |
|---|---|
| Windows 7/IE | C : \Users\username \AppData \Roaming\Microsoft\Windows\Cookies<br>C: \Users \username \AppData \Roaming \Microsoft \Windows \Cookies \Lo |
| Windows 8/IE | C : \Users \username \AppData \Local \Microsoft \Windows \INetCookies |
| Mozilla | C : \Documents and Settings \username \Application Data \Mozilla \Firefox \Profiles\ |
| Chrome | C: \Documents and Settings \username \Local Settings \Application Data \Google \Chrome \User Data \Default \Cookies |

Table 3: Locations for Watermark Cookies.

MALWARE DETECTION USING WATERMARK COOKIES

CROSS REFERENCE TO OTHER APPLICATIONS

This application is a continuation of U.S. patent application Ser. No. 16/706,501 entitled MALICIOUS HTTP COOKIES DETECTION AND CLUSTERING filed Dec. 6, 2019, which is a continuation of U.S. patent application Ser. No. 15/141,739, now U.S. Pat. No. 10,547,627, entitled MALICIOUS HTTP COOKIES DETECTION AND CLUSTERING filed Apr. 28, 2016, which claims priority to U.S. Provisional Patent Application No. 62/305,464 entitled MALICIOUS HTTP COOKIES DETECTION AND CLUSTERING filed Mar. 8, 2016, all of which are incorporated herein by reference for all purposes.

BACKGROUND OF THE INVENTION

A firewall generally protects networks from unauthorized access while permitting authorized communications to pass through the firewall. A firewall is typically a device or a set of devices, or software executed on a device, such as a computer, which provides a firewall function for network access. For example, firewalls can be integrated into operating systems of devices (e.g., computers, smart phones, or other types of network communication capable devices). Firewalls can also be integrated into or executed as software on computer servers, gateways, network/routing devices (e.g., network routers), or data appliances (e.g., security appliances or other types of special purpose devices).

Firewalls typically deny or permit network transmission based on a set of rules. These sets of rules are often referred to as policies. For example, a firewall can filter inbound traffic by applying a set of rules or policies. A firewall can also filter outbound traffic by applying a set of rules or policies. Firewalls can also be capable of performing basic routing functions.

BRIEF DESCRIPTION OF THE DRAWINGS

Various embodiments of the invention are disclosed in the following detailed description and the accompanying drawings.

FIG. 6A illustrates a table for exemplary labels for cookies in accordance with some embodiments.

FIG. 6B illustrates a table for detection results on a test data set in accordance with some embodiments.

FIG. 8 illustrates a table for locations for watermark cookies in accordance with some embodiments.

DETAILED DESCRIPTION

Figure 1:
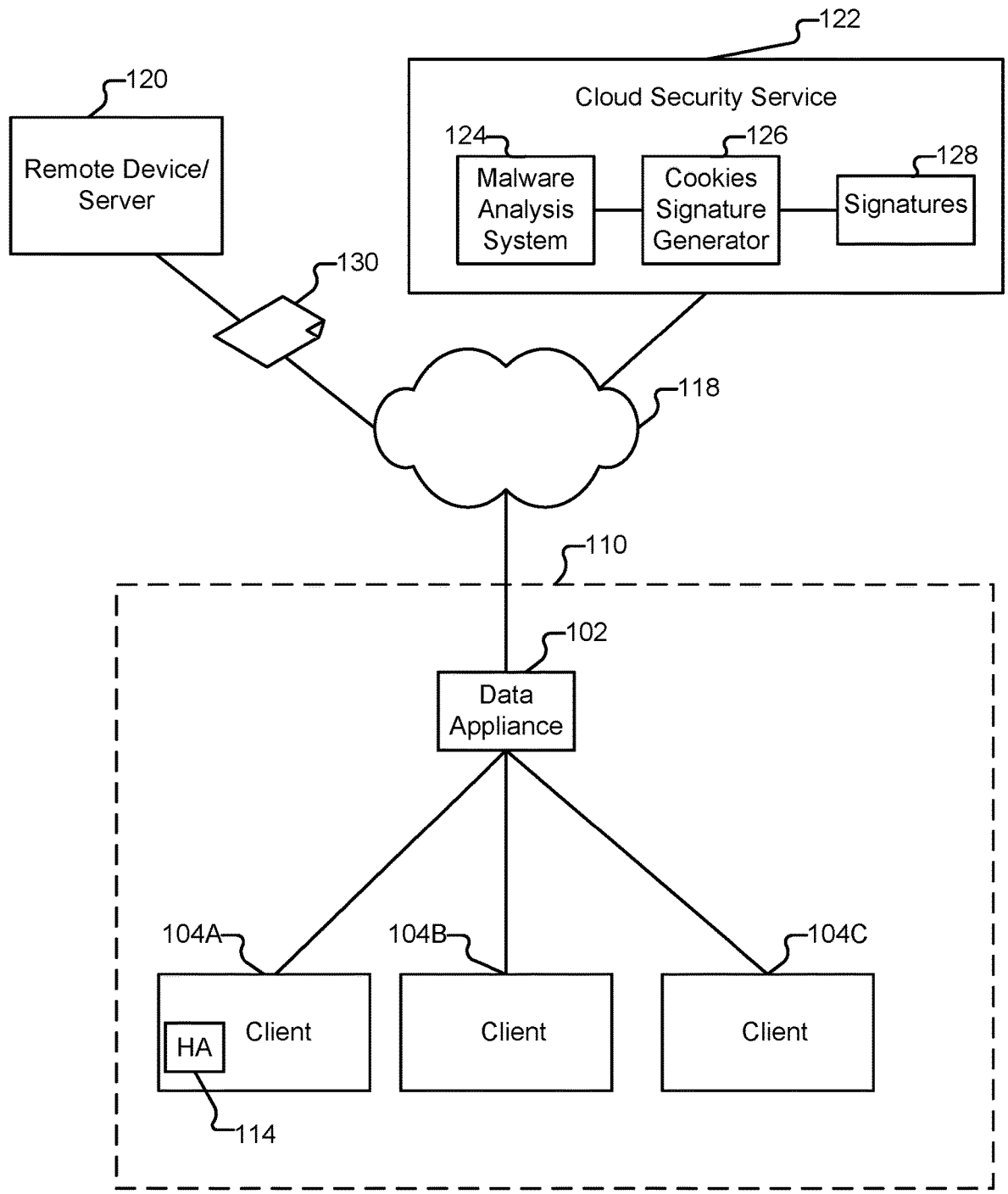
FIG. 1 is a functional diagram of a network architecture for a data appliance in accordance with some embodiments.

The invention can be implemented in numerous ways, including as a process; an apparatus; a system; a composition of matter; a computer program product embodied on a tangible computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A firewall generally protects networks from unauthorized access while permitting authorized communications to pass through the firewall. A firewall is typically a device, a set of devices, or software executed on a device that provides a firewall function for network access. For example, a firewall can be integrated into operating systems of devices (e.g., computers, smart phones, or other types of network communication capable devices). A firewall can also be integrated into or executed as software applications on various types of devices or security devices, such as computer servers, gateways, network/routing devices (e.g., network routers), or data appliances (e.g., security appliances or other types of special purpose devices).

Firewalls typically deny or permit network transmission based on a set of rules. These sets of rules are often referred to as policies (e.g., network policies or network security policies). For example, a firewall can filter inbound traffic by applying a set of rules or policies to prevent unwanted outside traffic from reaching protected devices. A firewall can also filter outbound traffic by applying a set of rules or policies (e.g., allow, block, monitor, notify or log, and/or other actions can be specified in firewall rules or firewall policies, which can be triggered based on various criteria, such as described herein).

Security devices (e.g., security appliances, security gateways, security services, and/or other security devices) can include various security functions (e.g., firewall, anti-malware, intrusion prevention/detection, proxy, and/or other security functions), networking functions (e.g., routing, Quality of Service (QoS), workload balancing of network related resources, and/or other networking functions), and/or other functions. For example, routing functions can be based on source information (e.g., IP address and port), destination information (e.g., IP address and port), and protocol information.

A basic packet filtering firewall filters network communication traffic by inspecting individual packets transmitted over a network (e.g., packet filtering firewalls or first generation firewalls, which are stateless packet filtering firewalls). Stateless packet filtering firewalls typically inspect the individual packets themselves and apply rules based on the inspected packets (e.g., using a combination of a packet's source and destination address information, protocol information, and a port number).

Application firewalls can also perform application layer filtering (e.g., using application layer filtering firewalls or second generation firewalls, which work on the application level of the TCP/IP stack). Application layer filtering firewalls or application firewalls can generally identify certain applications and protocols (e.g., web browsing using HyperText Transfer Protocol (HTTP), a Domain Name System (DNS) request, a file transfer using File Transfer Protocol (FTP), and various other types of applications and other protocols, such as Telnet, DHCP, TCP, UDP, and TFTP (GSS)). For example, application firewalls can block unauthorized protocols that attempt to communicate over a standard port (e.g., an unauthorized/out of policy protocol attempting to sneak through by using a non-standard port for that protocol can generally be identified using application firewalls).

Stateful firewalls can also perform stateful-based packet inspection in which each packet is examined within the context of a series of packets associated with that network transmission's flow of packets/packet flow (e.g., stateful firewalls or third generation firewalls). This firewall technique is generally referred to as a stateful packet inspection as it maintains records of all connections passing through the firewall and is able to determine whether a packet is the start of a new connection, a part of an existing connection, or is an invalid packet. For example, the state of a connection can itself be one of the criteria that triggers a rule within a policy.

Advanced or next generation firewalls can perform stateless and stateful packet filtering and application layer filtering as discussed above. Next generation firewalls can also perform additional firewall techniques. For example, certain newer firewalls sometimes referred to as advanced or next generation firewalls can also identify users and content. In particular, certain next generation firewalls are expanding the list of applications that these firewalls can automatically identify to thousands of applications. Examples of such next generation firewalls are commercially available from Palo Alto Networks, Inc. (e.g., Palo Alto Networks' PA Series firewalls).

For example, Palo Alto Networks' next generation firewalls enable enterprises to identify and control applications, users, and content—not just ports, IP addresses, and packets—using various identification technologies, such as the following: APP-ID (e.g., App ID) for accurate application identification, User-ID for user identification (e.g., by user or user group), and Content-ID for real-time content scanning (e.g., controls web surfing and limits data and file transfers). These identification technologies allow enterprises to securely enable application usage using business-relevant concepts, instead of following the traditional approach offered by traditional port-blocking firewalls. Also, special purpose hardware for next generation firewalls implemented, for example, as dedicated appliances generally provide higher performance levels for application inspection than software executed on general purpose hardware (e.g., such as security appliances provided by Palo Alto Networks, Inc., which utilize dedicated, function specific processing that is tightly integrated with a single-pass software engine to maximize network throughput while minimizing latency).

HTTP Cookies for Web Sites

Figure 4:
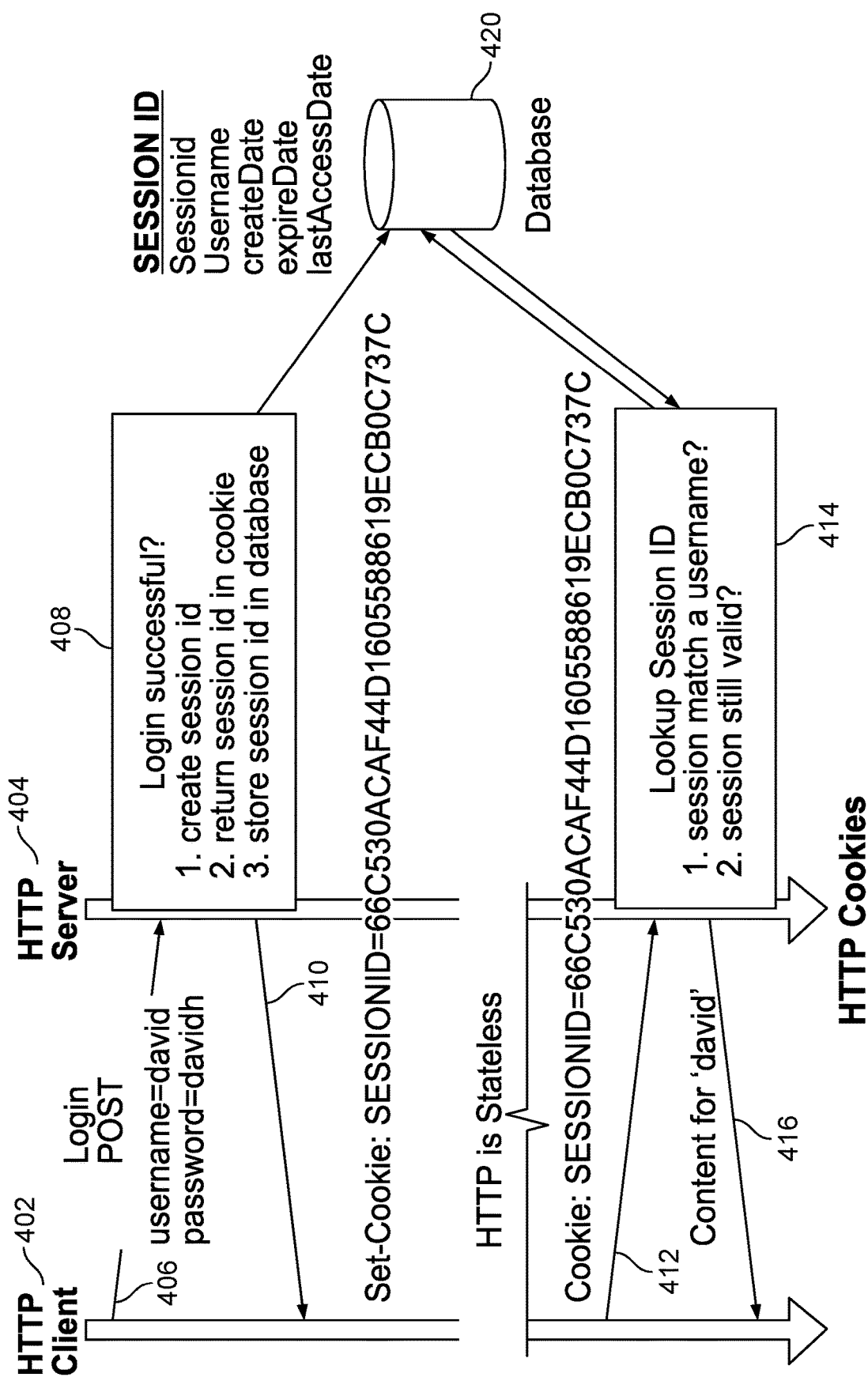
FIG. 4 is an illustration of HTTP cookies.

Cookies (e.g., HTTP cookies) are commonly used by web sites to store the user's information while the user is interacting with the web site. FIG. 4 is an illustration of HTTP cookies. Specifically, FIG. 4 is an example illustration of how HTTP cookies are commonly used by web sites.

As shown in FIG. 4, an HTTP client 402 is in network communication with an HTTP server via the HyperText Transfer Protocol (HTTP). At 406, a user attempts to log into the HTTP server 404 (e.g., a web server) and sends login information via a POST using the HTTP protocol that includes the user's username and password (e.g., shown as username=david and password=davidh in this example). If the login is successful, then the HTTP server creates a session ID, stores the session ID in a database 420, and returns the session ID in a cookie as shown at 408. At 410, the HTTP server sends a Set-Cookie response to the HTTP client that includes the SESSIONID as shown.

As discussed above, HTTP is a stateless protocol. As such, if the HTTP client communicates again with the HTTP server, then the client sends the cookie (e.g., the previously received session ID value) to the HTTP server as shown at 412. At 414, the HTTP server performs a lookup of the session ID in database 420 to verify that the session matches a username and that the session is still valid. If so, then the HTTP server responds with content for the user (e.g., the user=david in this example) as shown at 416.

Types of cookies include the following: session cookies, persistent cookies, and third-party cookies. Session cookies are temporary and are only validated each session. Persistent cookies expire on a certain date and have long-term validation. Third-party cookies belong to a different domain and facilitate cross domain user tracking. For example, cookies are commonly used to: validate visitors, track users, exchange information, and label a unique session.

However, malware can also utilize cookies as further discussed below.

Overview of Techniques for Malicious HTTP Cookies Detection and Clustering

Thus, what are needed are new and improved techniques for detecting malware based on cookies (e.g., HTTP cookies).

Accordingly, various techniques for malicious HTTP cookies detection and clustering are disclosed. For example, the disclosed techniques can facilitate enhanced malware detection as will be further described below.

In some embodiments, a system, process, and/or computer program product for malicious HTTP cookies detection and clustering includes receiving a sample at a cloud security service; extracting a cookie from network traffic associated with the sample; determining that the cookie is associated with malware; and generating a signature based on the cookie. For example, the cookie can be extracted from a packet capture of the network traffic associated with the sample.

In one embodiment, a system, process, and/or computer program product for malicious HTTP cookies detection and clustering further includes extracting one or more strings from the cookie; and analyzing the one or more strings.

In one embodiment, a system, process, and/or computer program product for malicious HTTP cookies detection and clustering further includes extracting one or more patterns from the cookie to generate the signature.

In one embodiment, a system, process, and/or computer program product for malicious HTTP cookies detection and clustering further includes applying a false positive filter to verify that the signature does not match a threshold level of benign network traffic.

In one embodiment, a system, process, and/or computer program product for malicious HTTP cookies detection and clustering further includes determining that the cookie is a malicious cookie (e.g., that the cookie is associated with malware) using clustering-based techniques and/or content-based techniques as further described below.

In one embodiment, a system, process, and/or computer program product for malicious HTTP cookies detection and clustering further includes extracting a textual pattern extraction from the cookie; and classifying the cookie based on the textual pattern as further described below.

In some embodiments, a system, process, and/or computer program product for malicious HTTP cookies detection and clustering includes monitoring network traffic at a data appliance; extracting an HTTP cookie from the monitored network traffic; determining that the HTTP cookie is a malicious HTTP cookie based on a signature; and performing an action in response to determining that the HTTP cookie is a malicious HTTP cookie based on the signature.

In an example implementation, a cloud security service can detect malicious HTTP traffic based on cookies in HTTP headers and cluster the cookies. In this example, malware samples can be received at the cloud security service from subscribing firewalls. The malware samples can each include a packet capture (PCAP) of HTTP traffic. The cloud security service can analyze the PCAP files to extract cookies from HTTP traffic (e.g., from HTTP headers in HTTP traffic). The extracted cookies are automatically analyzed to identify unique patterns in cookies based on a pattern match analysis of cookies. For example, identified common patterns on the malware associated cookies can include a textual analysis of key-value pairs associated with cookies, such as the following: length, types of characters, upper/lower case letters, use of specific characters (e.g., underline or other types of special characters), and/or an entropy analysis (e.g., calculate an entropy and compare to threshold to determine whether randomly generated). The results of the textual analysis can then be used to determine if the common patterns are shared with a known malware family (e.g., by performing a cluster-based analysis using common strings extraction to determine least common strings using the well-known longest common subsequence (LCS) algorithm for finding the longest subsequence common to all sequences in a set of sequences). If the common patterns are shared with a known malware family, then a new signature can be automatically generated (e.g., the common pattern can be utilized as a cookie-based signature). In this example, the new signature can be tested to verify that it does not result in too many false positives (e.g., a false positive (FP) filter can be applied to determine if the generated signature would also match a threshold number of benign cookie patterns and, if so, then the signature can be discarded).

These and other aspects of the disclosed techniques for malicious HTTP cookies detection and clustering will now be further described below.

Overview of Techniques for Cookies Watermarking in Malware Analysis

Thus, what are needed are new and improved techniques for detecting malware based on cookies (e.g., HTTP cookies).

Accordingly, various techniques for cookies watermarking in malware analysis are disclosed. For example, the disclosed techniques can facilitate enhanced malware detection as will be further described below.

In some embodiments, a system, process, and/or computer program product for cookies watermarking in malware analysis includes receiving a sample at a cloud security service; detonating the sample in an instrumented virtual environment; and determining that the sample is malware based on detecting an attempt to access a watermark cookie during an automated malware analysis using the instrumented virtual environment. For example, the watermark cookie can be an HTTP cookie that is associated with a web site (e.g., a popular or well-known web site, such as a social networking web site).

In one embodiment, a system, process, and/or computer program product for cookies watermarking in malware analysis further includes injecting the watermark cookie in the instrumented virtual environment to provide a modified virtual environment, wherein the sample is detonated in the modified virtual environment.

In one embodiment, a system, process, and/or computer program product for cookies watermarking in malware analysis further includes detecting whether the watermark cookie was accessed (e.g., opened, modified, or sent) in the modified virtual environment.

In one embodiment, a system, process, and/or computer program product for cookies watermarking in malware analysis further includes automatically generating a signature for the sample if the sample is determined to be malware.

In one embodiment, a system, process, and/or computer program product for cookies watermarking in malware analysis further includes detecting that the sample is malware based on a cookie-based signature (e.g., generated using the disclosed techniques for malicious HTTP cookies detection and clustering as further described herein).

These and other aspects of the disclosed techniques for cookies watermarking in malware analysis will also be further described below.

Example Network Architecture for a Data Appliance

FIG. 1 is a functional diagram of a network architecture for a data appliance in accordance with some embodiments. For example, such an environment can detect and prevent malware from causing harm (e.g., malicious software can include any executable program, such as active content, executable code, and scripts, that can interfere with the operation of a computing device or computer network, attempt unauthorized access of data or components of a computing device, and/or perform various other malicious, unauthorized, and/or undesirable activities). In particular, a variety of attempts by a malicious individual to propagate malware (e.g., malware 130) via system 120 are described, as are techniques for thwarting that propagation or execution of such malware in protected network computing environments, such as for protecting computing devices within an enterprise network 110.

In the example shown in FIG. 1, devices 104A, 104B, and 104C are client devices (e.g., a laptop computer, a desktop computer, a tablet, a smart phone, and/or other types of client devices) present in an enterprise network 110. A data appliance 102 is configured to enforce policies regarding communications between clients, such as clients 104A and 104B, and nodes outside of enterprise network 110 (e.g., reachable via external network 118, such as the Internet). Examples of such policies include ones governing traffic shaping, quality of service, and routing of traffic. Other examples of policies include security policies (e.g., firewall policies) such as ones requiring the scanning for threats in incoming (and/or outgoing) email attachments, web site downloads, files exchanged through instant messaging programs, and/or other file transfers. In some embodiments, appliance 102 is also configured to enforce policies with respect to traffic that stays within enterprise network 110.

Data appliance 102 can take a variety of forms. For example, appliance 102 can be a dedicated device or set of devices. The functionality provided by appliance 102 can also be integrated into or executed as software on a general purpose computer, a computer server, a gateway, and/or a network/routing device. For example, in some embodiments, services provided by data appliance 102 are instead (or in addition) provided to client 104A by software executing on client 104A, such as host agent (HA) 114 as shown in FIG. 1.

Whenever data appliance 102 is described as performing a task, a single component, a subset of components, or all components of appliance 102 may cooperate to perform the task. Similarly, whenever a component of appliance 102 is described as performing a task, a subcomponent may perform the task and/or the component may perform the task in conjunction with other components. In various embodiments, portions of appliance 102 are provided by one or more third parties. Depending on factors such as the amount of computing resources available to appliance 102, various logical components and/or features of appliance 102 may be omitted and the techniques described herein adapted accordingly. Similarly, additional logical components/features can be added to appliance 102 as applicable.

As will be described in more detail below, appliance 102 can be configured to perform malware analysis/prevention. As another example, cloud security service 122 can receive malware samples that can be executed using a malware analysis system 124 to automatically generate signatures using cookies signature generator 126 that can be stored in signatures data store 128 (e.g., malware signatures, such as signatures generated based on malicious HTTP cookies as described herein) that can be sent to appliance 102 (e.g., as part of a subscription service). Example signatures that can be generated using cloud security service 122 (e.g., and sent to appliance 102) for implementing the disclosed techniques will be further described below. In an example implementation, appliance 102 can be implemented using a commercially available firewall appliance provided by Palo Alto Networks, Inc., and the cloud security service can be implemented using a commercially available security service, such as the WildFire™ cloud-based malware analysis environment provided by Palo Alto Networks, Inc. (e.g., see www.paloaltonetworks.com/products/technologies/wildfire.html).

Example Components a Data Appliance

Figure 2:
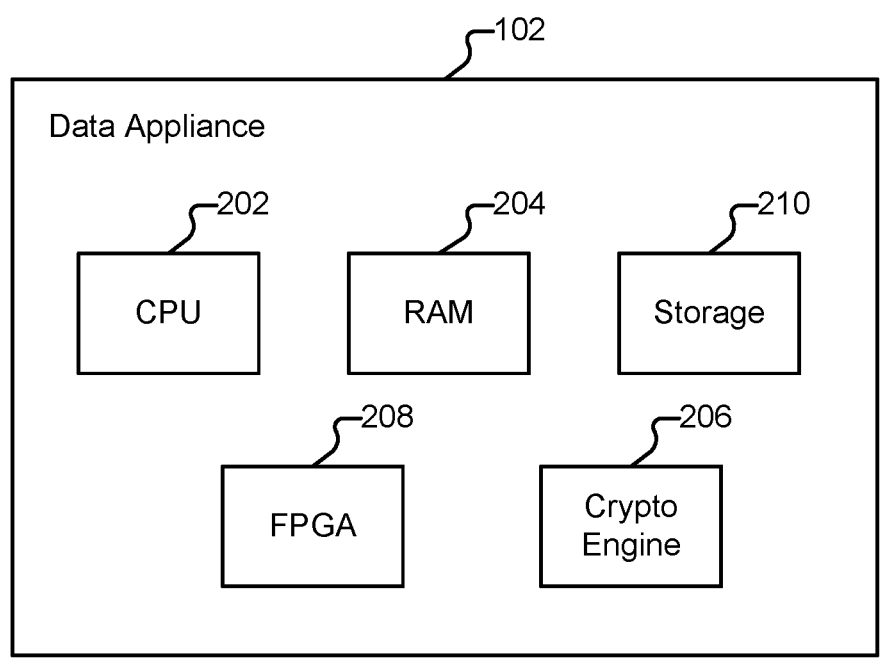
FIG. 2 illustrates a data appliance in accordance with some embodiments.

FIG. 2 illustrates a data appliance in accordance with some embodiments. The example shown is a representation of physical components that are included in data appliance 102, in some embodiments. Specifically, data appliance 102 (e.g., a device that performs various security related functions, such as a security device, which can be in the form of, for example, a security appliance, security gateway, security server, and/or another form of a security device) includes a high performance multi-core CPU 202 and RAM 204. Data appliance 102 also includes a storage 210 (such as one or more hard disks), which is used to store policy and other configuration information. Data appliance 102 can also include one or more optional hardware accelerators. For example, data appliance 102 can include a cryptographic component 206 configured to perform encryption and decryption operations, and one or more FPGAs 208 configured to perform matching (e.g., pattern matching, such as for application identification (App ID) as further described below with respect to FIG. 3), act as network processors, and/or perform other tasks.

Figure 3:
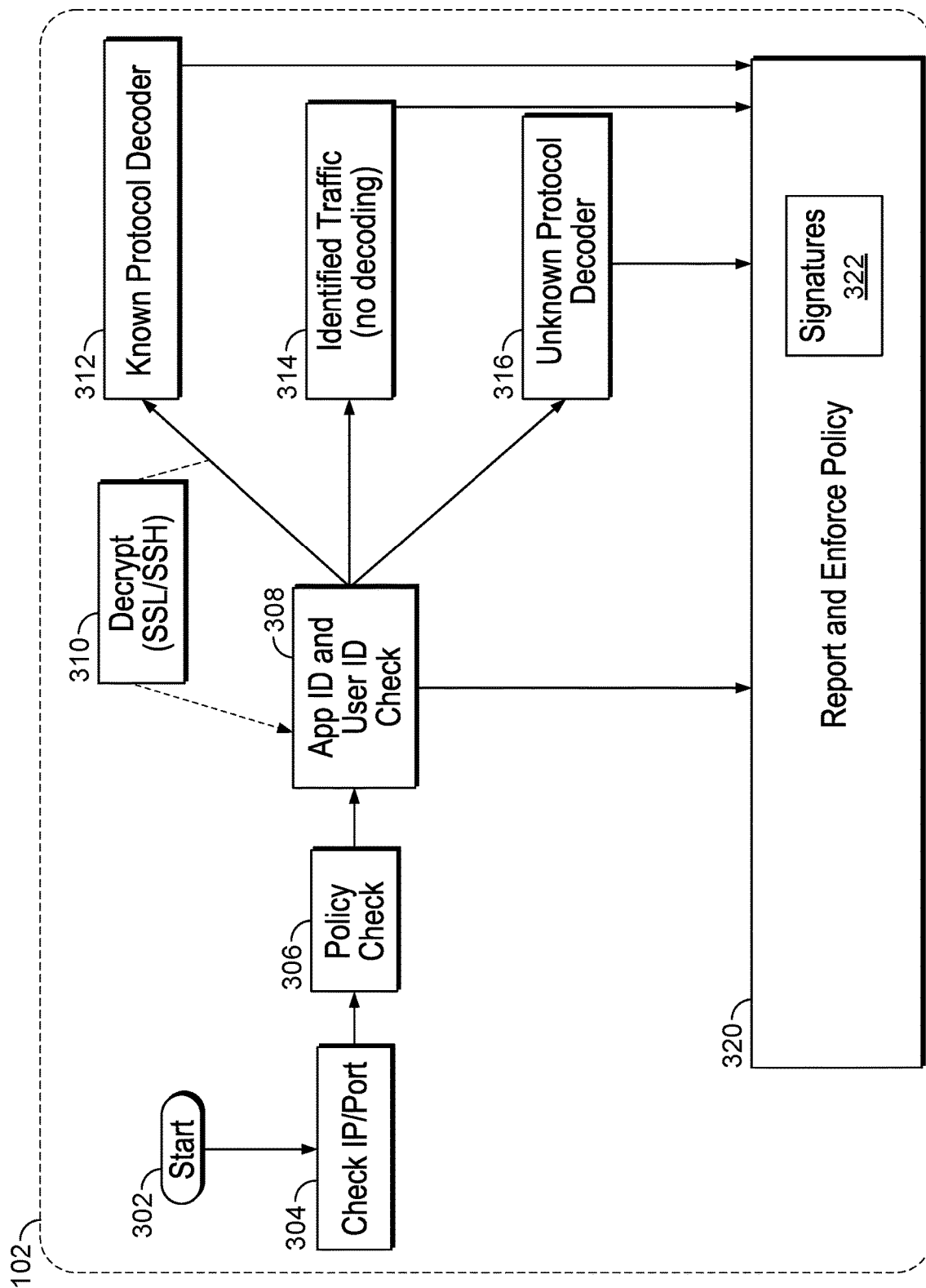
FIG. 3 is a functional diagram of an architecture of a data appliance in accordance with some embodiments.

FIG. 3 is a functional diagram of an architecture of a data appliance in accordance with some embodiments. As shown in FIG. 3, network traffic is monitored at data appliance 102. In one embodiment, network traffic is monitored using a data appliance (e.g., a data appliance that includes security functions, such as a security device/appliance that includes a firewall). In one embodiment, network traffic is monitored using a gateway (e.g., a gateway that includes security functions, such as a security gateway/network gateway firewall). In one embodiment, the network traffic is monitored using pass through (e.g., in-line) monitoring techniques.

In one embodiment, network traffic is monitored using a state-based firewall. In one embodiment, the state-based firewall can monitor traffic flows using an application (app) identifier (ID) component (e.g., APP-ID (App ID) engine, shown as App ID Check & User ID Check 308 in FIG. 3). For example, the monitored network traffic can include HTTP traffic, HTTPS traffic, FTP traffic, SSL traffic, SSH traffic, DNS requests, unclassified application traffic (e.g., unknown application traffic), and/or other types of traffic (e.g., traffic using other types of known or unknown protocols).

As shown in FIG. 3, network traffic monitoring begins at 302. An IP address and port component 304 determines an IP address and port number for a monitored traffic flow (e.g., a session) based on packet analysis. A policy check component 306 determines whether any policies can be applied based on the IP address and port number. As also shown in FIG. 3, an App ID Check & User ID Check 308 identifies an application and a user. For example, the application can be identified using an App ID component (308) using various application signatures for identifying applications based on packet flow analysis (e.g., implemented using an FPGA, such as FPGA 208 as shown in FIG. 2). The user identification can also be determined based on a source IP address (e.g., based on one or more IP addresses). In this example, the App ID component (308) can be configured to determine what type of traffic the session involves, such as HTTP traffic, HTTPS traffic, FTP traffic, SSL traffic, SSH traffic, DNS requests, unknown traffic, and various other types of traffic, and such classified traffic can be directed to an appropriate decoder, such as decoders 312, 314, and 316, to process the classified traffic for each monitored session's traffic flow.

As also shown in FIG. 3, if the monitored traffic is encrypted (e.g., encrypted using HTTPS, SSL, SSH, or another known encryption protocol), then the monitored traffic can be decrypted using a decrypt component 310 (e.g., applying trusted man-in-the-middle techniques using a self-signed certificate associated with the network device, such as a data appliance, gateway, or other network device implementing the firewall). A known protocol decoder component 312 decodes and analyzes traffic flows using known protocols (e.g., applying various signatures (322) for the known protocol) and reports the monitored traffic analysis to a report and enforce policy component 320. For example, known protocol decoder component 312 can decode and analyze HTTP/HTTPS traffic flows for applying the disclosed techniques (e.g., applying a generated HTTP cookie signature to detect a malicious HTTP cookie in HTTP traffic and/or applying other malware signatures as further described below). Identified traffic (no decoding required) component 314 reports the identified traffic to the report and enforce policy component 320. An unknown protocol decoder component 316 decodes and analyzes traffic flows (e.g., applying various heuristics) and reports the monitored traffic analysis to the report and enforce policy component 320.

In one embodiment, the results of the various traffic monitoring techniques using known protocol decoder component 312, identified traffic component 314, and unknown protocol decoder component 316 described above are provided to report and enforce policies component 320 (e.g., network/routing policies, security policies, and/or firewall policies). For example, firewall policies can be applied to the monitored network traffic using application identification, user identification, and/or other information to match signatures 322 (e.g., application/APP ID signatures, such as HTTP cookie signatures (e.g., signatures generated based on attributes associated with HTTP cookies) as further described below, as well as file-based, protocol-based, and/or other types/forms of signatures for detecting malware or suspicious behavior).

In one embodiment, appliance 102 also includes a content-ID component (not shown). In one embodiment, the content-ID component's identified content is also used by report and enforce policy component 320, possibly in various combinations with other information, such as application, user, and/or other information, to enforce various security/firewall policies/rules.

In an example implementation, the App ID component (308) of data appliance 102 can be implemented using the disclosed techniques for malicious HTTP cookies detection and clustering and the disclosed techniques for cookies watermarking in malware analysis as further described below. As such, FIGS. 1-3 are provided as example environments and example applications that can benefit from implementing the disclosed techniques for malicious HTTP cookies detection and clustering and the disclosed techniques for cookies watermarking in malware analysis.

Techniques for Malicious HTTP Cookies Detection and Clustering

A variety of techniques for malicious HTTP cookies detection and clustering are disclosed. In one embodiment, the disclosed techniques for malicious HTTP cookies detection and clustering can be performed using the data appliance and cloud security service described above with respect to FIGS. 1-3. These and other aspects of the techniques for malicious HTTP cookies detection and clustering will now be further described below.

As similarly discussed above, HTTP cookies are commonly used by web sites to store a user's information while the user is interacting with a web site. As an efficient mechanism to store the unique identity of a user, cookies play an important role for user tracking, user authentication and anti-spoofing.

While cookies are prevalent in normal and legitimate HTTP traffic, cookies are now being used for illegitimate traffic (e.g., malware/malicious traffic). For example, based on an empirical analysis, it was discovered that malware/malicious entities spawn millions of cookies every day and their below-the-surface logic of using cookies.

In one embodiment, the disclosed techniques include monitoring malware behaviors of generating cookies for their communication. In one embodiment, the disclosed techniques include extracting encoding and decoding schemes for cookies (e.g., and determining the underlying meaning/usage of each malicious cookie). As such, a set of effective heuristics and real-time detection approaches are described below for identifying malicious HTTP cookies in live network traffic. The aforementioned empirical study was conducted on a data set containing over 10,000 HTTP sessions generated by confirmed malware samples. The evaluation verifies that the disclosed techniques can efficiently and effectively detect the malicious traffic using the disclosed techniques (e.g., signatures based on malicious HTTP cookies) among the test data set with higher accuracy in comparison with traditional security detection technology schemes.

Generally, HTTP cookies can be provided for user authentication, tracking, and anti-spoofing in various network communications. For example, web-based applications often use cookies to keep the record of state in the stateless HTTP protocol. As part of a web/HTTP server's response, a web/HTTP server can send an arbitrary message in the Set-Cookie response header. As a result, the arbitrary information can be anything, such as a user identifier, a user key, or whatever the server utilizes so that it can continue where it left off.

In April 2011, a definitive specification of cookies was published by the Internet Engineering Task Force (IETF) as Request for Comments (RFC) 6265 (available at https://tools.ietf.org/html/rfc6265). According to the RFC 6265 specification, cookies can be classified by their application scope, as summarized below.

Session Cookies

A session cookie exists only in temporary memory while a user navigates a web site. Web browsers typically delete session cookies when the user closes the browser. Also, session cookies typically do not have an expiration date assigned to them. A session cookie commonly serves as a one-time authentication of the end-point user.

Persistent Cookies

Unlike session cookies, persistent cookies expire at a specific date or after a specific length of time. Hence, the persistent cookies will be transmitted every time the user visits the same web site. As such, persistent cookies provide an efficient mechanism to track user interactions over a period of time and/or a number of sessions.

Third-Party Cookies

Third-party cookies belong to domains different from the one shown in the address bar. Third-party cookies typically appear when web pages feature content, such as banner advertisements, from external web sites. Third-party cookies are commonly applied by advertisement networks. For example, an advertiser can read third-party cookies to aggregate a browsing history of the user across all the web sites that have such advertisements.

As seen from the above-described classification, cookies do not arise from some insidious invasion of your computer. Rather, a common case is that a browser uses cookies to store only the data it receives from a visited server (e.g., web server). For example, a cookie can be an authentication token to identify an end user. Also, a cookie can be a status indicator for a user to mark their interaction history. Such identical tokens can be an interesting aspect from viewing malware-generated traffic as further described below.

As also further described below, cookies can be extracted and analyzed to facilitate malware identity information (e.g., or their authentication mechanism). For example, cookies can be extracted and analyzed to determine a malware's infection status. In addition, the uniqueness of cookies can be determined to detect malicious HTTP traffic (e.g., cookies can facilitate detecting that a machine is infected with malware and/or to expose malicious samples).

An empirical analysis of cookies generated by confirmed malware samples (e.g., samples that are known to be malware samples) will be described below. The network traffic data was generated by the Palo Alto Networks Wildfire malware analysis system. In this example data set, over 1 million HTTP sessions generated by over 60,000 malware samples were collected. The results of the empirical analysis of cookies verified the efficacy of the disclosed techniques for malicious HTTP cookies detection and clustering as further described below. For example, the disclosed techniques can be applied for detection of malicious network traffic (e.g., HTTP traffic), which in turn facilitates detection of malicious samples (e.g., malware samples).

Data Collection and Preprocessing

Data Collection

In one embodiment, network traffic data is collected from a malware analysis system of a cloud security service (e.g., the Palo Alto Networks Wildfire malware analysis system, such as shown at 124 of FIG. 1). For example, the malware analysis system can execute each sample in a controlled environment with system-wide monitoring (e.g., implemented using an instrumented virtual machine environment for emulating a variety of different operating system and computing environments). In this example, the malware analysis system can collect fine-grained execution information, such as modified system files, transmitted network packets, web sites visited (e.g., URLs), and/or other information, for each examined sample. Also, network communications can be dumped into a packet capture (pcap) file for capturing network traffic generated by the sample during the emulation in the Palo Alto Networks Wildfire malware analysis system, and the pcap file can be provided for further analysis (e.g., offline analysis) of the network traffic. In the above-described empirical analysis, all of the samples were previously confirmed as malicious (i.e., known malware samples based on previous malware detection using other malware detection techniques). Furthermore, the Palo Alto Networks Wildfire malware analysis system previously labeled each sample with its malware family information (if any) (e.g., by cross-checking multiple resources, such as VirusTotal, which is available at www.virustotal.com).

In the above-described empirical analysis, 6,000 malware samples were collected, and the samples generated over 1 million HTTP sessions during 5 minutes of execution in the Palo Alto Networks Wildfire malware analysis system. Among these 1 million HTTP sessions, 803,432 unique cookies were identified in the HTTP traffic (e.g., using Palo Alto Networks Wildfire malware analysis system, which is a clean execution environment that is not preloaded with any user-related data beforehand, and as a result, any cookie generated purely depends on the logic of sample, without any external interference).

Preprocessing of Cookies

In one embodiment, an initial stage of the analysis is to preprocess the cookies and identify information from seemingly arbitrary data in the cookies as will be described below with respect to FIG. 5.

Figure 5:
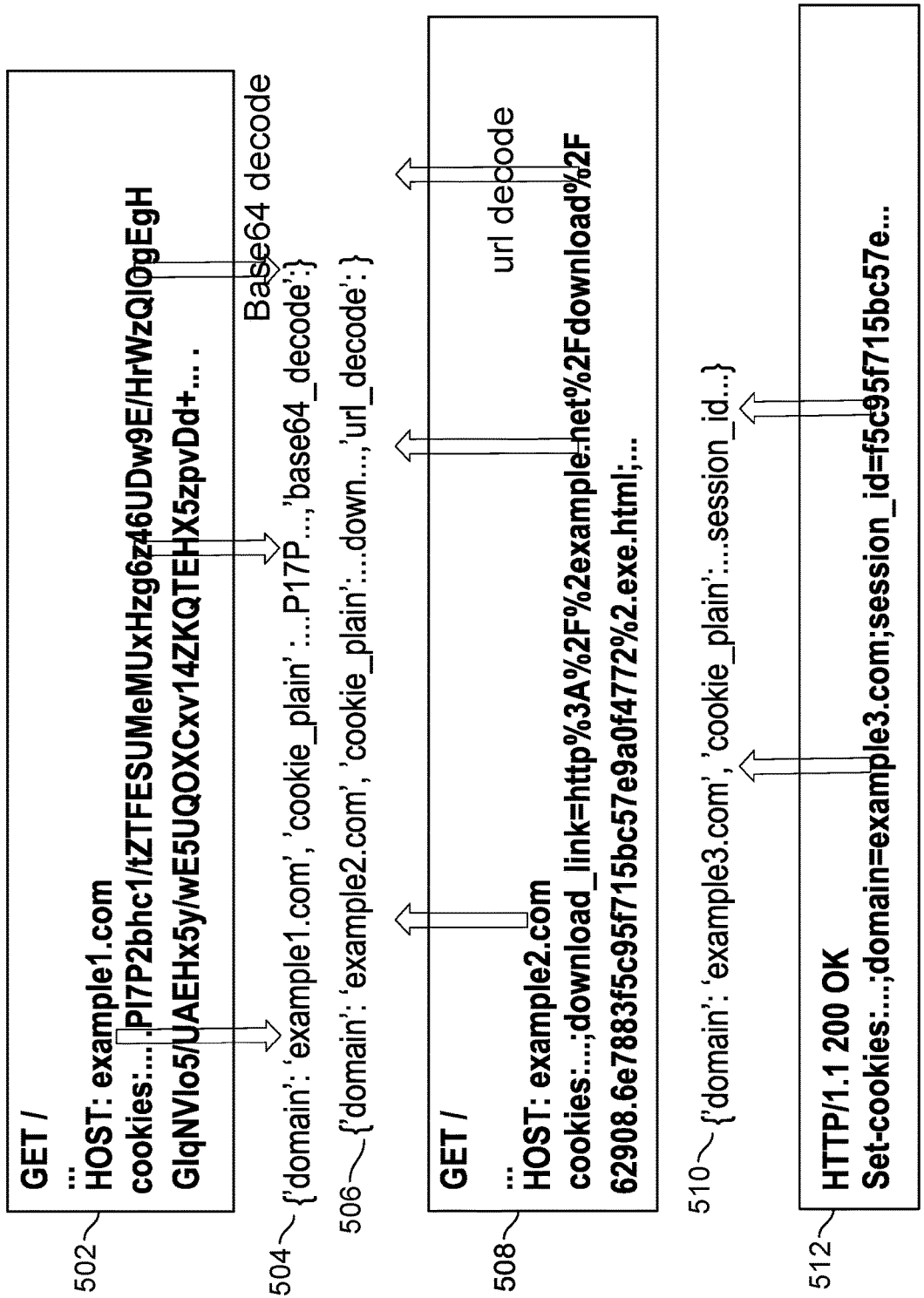
FIG. 5 is an illustration of cookies preprocessing in accordance with some embodiments.

FIG. 5 is an illustration of cookies preprocessing in accordance with some embodiments. According to the specification of RFC 6265, to maximize compatibility with user agents, servers that store arbitrary data in a cookie-value should encode that data, and the cookie fields of the cookie are recommended to be encoded before transmitting the cookie. For example, any such arbitrary data in a cookie-value can be encoded using a binary-to-text data encoding scheme, such as Base64 (e.g., as specified in RFC 4648, available at https://tools.ietf.org/html/rfc4648).

Referring to FIG. 5, as an initial operation of the cookie preprocessing, each cookie, such as example cookies shown at 502 and 508, is split as a sequence of key-value pairs by a predefined delimiter (e.g., commas or any special characters). Next, a base64 decoder is executed to decode all values to generate a sequence of key-value pairs separated by a predefined delimiter with all values decoded, such as shown at 504 and 506. If any meaningful value is encountered after decoding, such as a string with all characters in the ASCII range of characters, then the whole session is labeled as possibly Base64 encoded.

Aside from decoding the values, we also mark each cookie with its domain information as also shown at 504. For example, the domain information can be determined by first checking whether the cookie has an explicit domain field. If so, then the domain and all sub domains can be associated with the cookie (e.g., it is noted that the Microsoft Internet Explorer browser violates RFC 6265 as it will send the cookie to all subdomains as well, as further discussed at http://erik.io/blog/2014/03/04/definitive-guide-to-cookie-domains/, and while other browsers may disable such behavior, in this example, all sub-domains are associated to provide a conservative approach). If no explicit domain field is found in the cookie (e.g., such as in the example cookies shown at 502 and 508), then the cookie can be associated with the value of the host field in the HTTP header (e.g., such as shown at 504 and 506).

As a next operation of the cookie preprocessing, all cookies in each session can be organized together based on the transmission sequence and labeled accordingly.

In FIG. 5, these example preprocessing steps of one exemplary cookie sequence are illustrated. As illustrated in FIG. 5, a series of key-value pairs are obtained as shown at 504, 506, and 510, along with their domain and sequence information, after preprocessing of cookies 502, 508, and 512, respectively.

Experiments and Results: Analysis of Cookies

In this section, a series of experiments that were conducted and the results/findings of the series of experiments are discussed.

Experiment I. Test Whether Cookies are Associated with a Malware's Identifying Information and Even their Authentication Mechanism First, experiments were conducted based on an analysis of cookies to verify that cookies can be used to understand a malware's identifying information and even their authentication mechanism.

Specifically, understanding the identifying information hidden in an HTTP session can provide an efficient way for generating detection signatures, because it is commonly unique. Such information includes the identity for each sample (e.g., by the cookie in the HTTP request, such as similarly described above with respect to FIG. 5), the identity of the contacted server (e.g., by Set-Cookie in the HTTP response, such as similarly described above with respect to FIG. 5), or the identity of all samples in the same malware family (e.g., by cookie clusters, such as further described below). To prove Hypotheses I, all the HTTP sessions that potentially expose the malware identifying information are identified in the sample data set. In an example case, a focus is on finding potential command and control (C2) communication channels among all the traffic in the sample data set. Given that C2 communication commonly requires that client malware authenticate its identity, C2 communications represent a significant case for discovering identification information in HTTP session traffic.

In this experiment, the reputation information for each visited domain is combined. In contrast to malicious URLs, which could be used for exploitation, the reputation of domains as applied in this context can provide a useful indication of whether the whole session belongs to a C2 session. In these sessions, if a common key-value pair(s) is identified that exists in all or most of transactions, then such key-value pair(s) can be used to store the identity information of malware. In this case, discovery of such common key-value pairs can indicate that cookies are associated with a malware's identifying information.

Also, a set of well-known web sites are examined, such as social network web sites (e.g., Facebook, Twitter, or other social network web sites) that could be used as another mechanism for transmitting C2 messages. Hence, whether any session(s) contains the login request for well-known web sites is identified. As such, finding any such session(s) indicates that the malware's communication protocol is built on top of the existing web site mechanism. In this case, however, such cookies are not necessarily deemed to be malicious.

In addition, if any session starting from a request with a cookie is identified, but without a preceding Set-Cookie response, then such is deemed to represent a suspicious behavior indicating that malware is transmitting its identity information. In this case, all key-value pairs in the cookie could contain the malware identity information.

Findings of Analysis of Cookies from Experiment I

1. Malware Shares the Same Key/Format.

Among 803,432 cookies examined in the above-described experiment, 3,412 (or 0.4%) key-value pairs were found that potentially contain the identity information of malware. After examining these key-value pairs with reference to their respective malware family information, 1,631 (or 47.8%) of the keys can be well categorized by their respective malware family information. In particular, among all 543 samples, 53 patterns representing 53 families were identified. These results indicate that malware families commonly use the same format for transmitting their identifying information through cookies (e.g., HTTP cookies).

As a result, this reveals two key findings of experiment I. First, cookies exhibit a unique feature of a malware family. Second, a malware signature generated based on data in the cookies may apply to all samples in the same family. Each of these two key findings is further examined below in additional experiments and findings as discussed below.

2. Some Identity Values in Cookies are Generated by Customized Algorithms.

As discussed above, the 1,631 key-value pairs were determined to be associated with (e.g., belong to) 543 malware samples. Of these 543 malware samples, 300 of these malware samples were monitored again in a second pass of execution of each of these samples in the clean execution environment (e.g., detonated and monitored in an instrumented virtual machine (VM) executed in malware analysis system 124 of FIG. 1 for a period of time, such as for 5 minutes) and it was found that 73 (or 24.3%) of the 300 samples generate a different value for the same key in the second pass. Furthermore, most of these different key values were found to be generated by customized algorithms, in which the seed of such a customized algorithm could be, for example, time, system configuration, and/or hardware serial number (e.g., or some other attribute that can be associated with the execution environment). However, these customized algorithms were also determined to be typically performed using a server side executed process and set in the cookies (e.g., via a Set-Cookies response) by the server side executed process (e.g., a server-side program implements the customized algorithm as opposed to a locally executed program that would be executed locally in the clean execution environment in this example).

Accordingly, these findings can be applied to enhance security by applying the results of these findings to implement new security techniques based on cookies, such as described below.

In one embodiment, a malware client's request is emulated and a Set-Cookies response is monitored to detect whether a remote server is malicious.

In one embodiment, for invariant and unique values in a cookie extracted from network traffic (e.g., HTTP traffic), a signature (e.g., a malware signature generated based on the invariant and unique data of a cookie that was previously determined to be associated with a malware family) can be applied to detect whether the network traffic is malicious.

3. Malware Follows a General Authentication Routine.

In this test of experiment I, only 35 (or 2.14% of) key-value pairs were found to be initiated by the client. As such, this is a relatively small portion of the key-value pairs, and this finding indicates that the malware client normally does not initiate their authentication using cookies. Their initial authentication applies the URI or post data. Around 97% of the cases, the identifying information is verified by setting the authentication cookie later during the network communications. As a result, this test of experiment I reveals that most of the malicious servers are operating as full-functional HTTP servers and follow a general routine of user authentication.

4. Social Media is One Common Way for Client Authentication.

In this test of experiment I, approximately 412 (or 25% of) key-value pairs were found to be issued by a well-known social network web site. Some malware samples were even found to employ the authentication API provided by Facebook or Twitter for the purpose of authentication and control. Also, most of these key-value pairs were discovered as having been issued by malware families relating to social media spam and/or adware. Based on this finding, a new security technique can achieve an account-level blocking scheme by using cookies of these social media sites. For example, this security technique can be implemented by harvesting the token used by these samples, generating a signature based on the harvested token, and applying the signature (e.g., using data appliance 102 as shown in FIG. 3 to implement the signature as applied to decoded HTTP traffic).

Experiment II: Cookies can be Used to Detect a Malware Infection

In an HTTP session, cookies serve as a useful mechanism for tracking a user's session status. This experiment tests whether malware similarly is using cookies to mark their status on a given device (e.g., a client-side host, such as clients 104A, 104B, or 104C as shown in FIG. 1).

To test whether malware similarly uses cookies for tracking status, potential command and control (C2) communication channels are examined. In this case, the focus is to understand whether cookies indicate a malware's infection status or not.

Specifically, whether newly added key-value pairs can be associated with certain malicious behaviors or not is examined. In this experiment, a corpus of 543 malware samples from 211 different malware families, which contain potential identity key-value pairs, was utilized for analysis. Of these 211 different malware families, 40 representative malware families were selected, in which each family has more than 10 samples for this analysis.

Findings of Analysis of Cookies from Experiment II

1. The Change of Cookie Data Indicates the Status of Infection for Some Malware Families.

For each malware sample, the time stamps when the cookies have been modified by the HTTP server were recorded. Furthermore, 20 system-level malicious behaviors were defined. Examples of these system-level malicious behaviors can include running a new process, changing system files, downloading new files, and/or other system-level malicious behaviors. For example, by executing and monitoring these malware samples in the clean execution environment (e.g., detonated and monitored in an instrumented virtual machine (VM) executed in malware analysis system 124 of FIG. 1 for a period of time, such as for 5 minutes), the timestamps of the occurrences of each malicious behavior can be recorded. The recorded time stamp information can then be correlated. For example, the running/execution time can be divided into small time intervals (e.g., 2 ms). During each interval, for any change of cookies or any occurrence of malicious behaviors during the interval, then a 1 can be generated (e.g., as malicious behaviors can happen continuously throughout intervals, only the first interval is marked as 1 and the remaining intervals can be marked as 0 in this example). For each sample, time series sequences can then be generated for each of the following: (1) change of cookies ($T_1$); and (2) occurrence of malicious behaviors ($T_2$). Next, a cross-correlation analysis can be applied using the following correlation based on these two time series sequences:

$$\tau(n) = \frac{T_1 * T_2(n)}{\max(\sum(T_1), \sum(T_2))}, n = 1, 2, 3$$

to test the similarity of two time series sequences.

Among 40 families, 5 families were identified as having a statistically significant correlation (e.g., with an average τ above 0.6). As such, this result consumes 12% of the malware sample data set analyzed in experiment II, and it shows that, for most of the malware families, there does not appear to be clear evidence showing that the cookies correlate with infection status. However, for certain malware families that were analyzed (e.g., 3 out of 5), all average t values were above 0.8, which suggests that the modification of cookies reflects the infection status at the client-side host.

2. Same Family Exhibits Similar Pattern for Cookies Modification.

For all 10 malware samples in each family, whether the same family exhibits a similar modification pattern for cookies modification is tested. In this test, a vector is generated for the modification history for each malware sample. In each vector, the vector stores a series of triples as follows: cookie key; actionnewjremovejmodification; sequence, along the running/execution intervals. Next, a similarity of two vectors can be compared by common triples as follows:

$$\rho = \frac{\bigcap(V_1, V_2)}{\bigcup(V_1, V_2)}$$

In this test, over 31 (or 75%) of families were found to have an average p over 60%. This test result reveals that malware samples in the same family may change the cookies in a similar fashion, and very possibly, the remote HTTP server is the same C2 server. As such, this finding suggests a new security technique for verifying whether some malicious server is similar to a known malicious C2 server, such as further described below.

3. A Key-Value Pair in Cookies can be Used for Detecting Malicious Traffic in Advance.

As similarly discussed above, some malware families exhibit their infection progress through external cookies. This represents an interesting finding, because this finding indicates that the malware's progress can be detected/tracked by monitoring network traffic, such as further described below.

For example, one application is that the relevant key-value pair in malicious cookies can be determined such as similarly described above and that key-value pair data can be used to generate a signature. Network traffic can then be monitored (e.g., HTTP traffic can be monitored and decoded such as similarly described above with respect to FIG. 3) to detect when the relevant key-value pair appears in an HTTP header (e.g., based on applying the signature). Detecting that relevant cookie data in the HTTP header can be used as a security technology to detect malicious activity based on live network traffic analysis and protective measures/responses can be performed by a defender (e.g., data appliance 102 or HA 114 as shown in FIG. 1 can block the network/HTTP traffic, or perform some other measure/response, such as alert, block, drop, log, quarantine, and/or some other measure/response or a combination thereof can be performed).

Application

In this section, further experiments are discussed that indicate how cookies can be applied to design new security detection techniques. For example, two new techniques that use HTTP cookies to detect malicious activity are described below.

Experiment III: The Uniqueness of Cookies can be Applied to Detect Malicious HTTP Traffic Based on an examination of malicious HTTP cookies, a new technique to cluster and further detect malicious cookies among a significant amount of network traffic is disclosed.

Clustering Cookies to Identify Aa Malicious Cookie Pattern

In one embodiment, a new technique for malicious HTTP cookies detection and clustering includes clustering cookies to identify a malicious cookie pattern. In this experiment, the training data set contains 40,000 unique cookies that are generated by malicious samples and also 100,000 cookies generated in benign/normal network traffic (e.g., network traffic that is not associated with malware).

FIG. 6A illustrates a table for exemplary labels for cookies in accordance with some embodiments. As similarly discussed above in the cookie preprocessing section, each cookie can be split or subdivided into pieces/segments of text using a set of delimiters (e.g., any special characters). For each piece/segment, it is labeled by its text attribute (e.g., all letters, all digits, or other attributes). Example text labels include 32 categories and some example labels are listed in Table 1 as shown at 610 of FIG. 6A. In an example implementation, all of these labels can be processed in linear time. After conversion, the cookie can be compressed by only keeping the text attributes and delimiter information. Also, by altering the set of delimiters, the granularity of patterns can be controlled. An example demonstration of cluster generation is shown in FIG. 7 as further described below.

Figure 7:
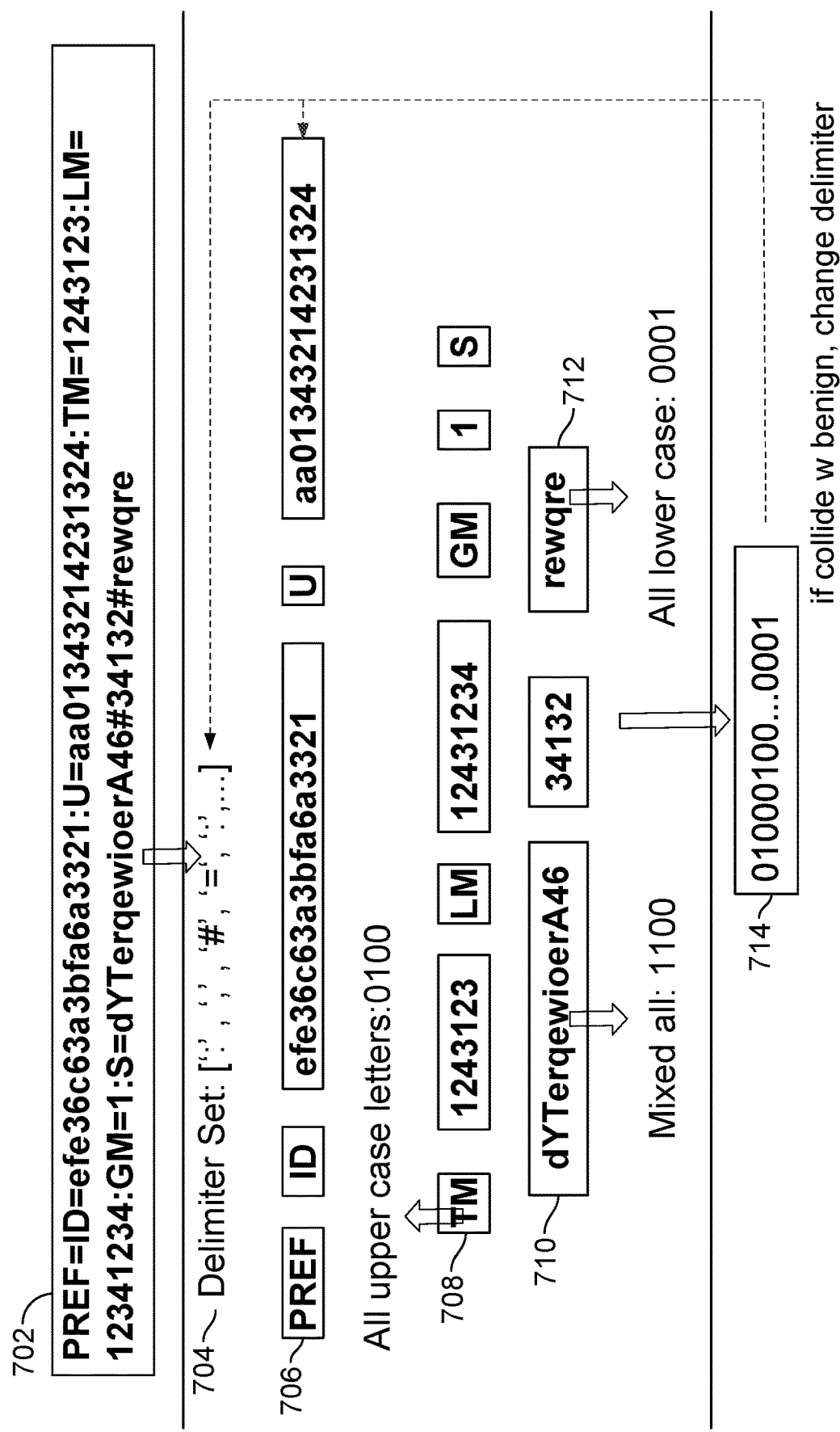
FIG. 7 is an illustration of processing of cookies to facilitate clustering the cookies in accordance with some embodiments.

FIG. 7 is an illustration of processing of cookies to facilitate clustering the cookies in accordance with some embodiments. In one embodiment, as an initial processing stage, cookies can be segmented, labeled, and compressed as also similarly described above with respect to FIG. 6A.

Referring to FIG. 7, a cookie 702 is processed using a delimiter set as shown at 704. Next, the pieces/segments of the cookie are extracted as shown at 706 (e.g., the pieces/segments of data between the delimiters). The pieces/segments are then analyzed and labeled as shown at 708, 710, and 712 as also similarly described above with respect to FIG. 6A. The cookie is then compressed using the sequence of relevant labels as shown at 714.

After processing malicious HTTP cookies, such as described above and as shown in FIG. 7, the cookies can be clustered in order to cluster malicious cookies by the pattern generated in the initial processing stage. To delete some potential false positive patterns, the same processing steps can similarly be performed for the benign/normal traffic, and the pattern can be removed (e.g., or modified using different delimiters as described below) if it exists in benign/normal traffic (e.g., to provide a false positive filter, such as similarly described below). In some cases, the result of compressing the cookie can be determined to collide with one or more benign cookies (e.g., based on the false positive filtering described herein). In such cases, a different delimiter set can be utilized and the above-described process can be repeated to attempt to compress the malicious HTTP cookie without colliding with any benign cookies (e.g., or with less than a threshold number of false positives). In some cases, another source that can be used to filter some false positives is the cookiepedia.co.uk web site, which can be used to check the reputation of some cookies.

After clean-up/removal of possible false positive cookies (e.g., patterns of such cookies based on the initial processing stage), all of the remaining malicious cookies were clustered in this test of the data set (e.g., a well-known clustering algorithm can be utilized for the clustering of the malicious HTTP cookies, such as the least squares clustering algorithm). For 40,000 unique cookies, 3,193 clusters were found using the above-described clustering technique.

Detect Results

FIG. 6B illustrates a table for detection results on a test data set in accordance with some embodiments. In the detection test of experiment III, 100,000 malicious cookies and 900,000 cookies from normal traffic were collected for the test data set. As a first approach (Approach I), the well-known classification algorithm of K-nearest neighbors (KNN) was applied to the data set to perform detection based on the clustering. The overall result is shown as Approach I in Table 2 as shown at 620 of FIG. 6B. To compare the performance, the clustering-based approach was compared with a content-based approach. For each cookie, the reputation of the cookie's domain was checked using VirusTotal. As shown in Table 2 as shown at 620 of FIG. 6B, the disclosed clustering-based approach achieved a significantly better detection ratio but also exhibited a slightly higher false positive (FP) ratio. As such, these two approaches can be combined to provide enhanced accuracy and a lower FP ratio, such as described below.

In one embodiment, a malicious network traffic detection technique based on cookies includes performing both the above-described cluster-based approach and the content-based approach. Based on testing using the same data set, the combined approach achieved an accuracy of 91.2%.

Experiment IV: Cookies can be Applied to Detect an Infected Machine. Also, Cookies can be Applied to Expose Malicious Samples In previous sections, various techniques were discussed that can be used to detect infected machines by examining external network traffic. Specifically, these above-described techniques for malicious HTTP cookies detection and clustering include applying one or more of the following techniques to detect infected machines by examining external network traffic: (1) generate a cookies-based signature on a key-value pair with a unique identity key-value pair; (2) generate a cookies-based signature on a key-value pair that indicates the status of infection; (3) detect malicious cookies by performing a clustering-based approach; and (4) detect malicious cookies by performing a content-based approach.

In the next section, techniques for cookies watermarking in malware analysis are disclosed. For example, techniques for cookies watermarking in malware analysis can include using cookies to assist end-point malware analysis. In this example, a heuristic is applied based on the observation and pattern of malware behavior that some web-based malware may steal user cookies for session hijacking (e.g., see www.owasp.org/index.php/Session_hijacking_attack). Also, some malware may exhibit its malicious behaviors only after the malware has found some cookie already present on the file system of the endpoint device (e.g., infected machine). Therefore, the disclosed techniques for cookies watermarking in malware analysis can also enhance a dynamic malware analysis system with support of watermark cookies, such as further described below.

Techniques for Cookies Watermarking in Malware Analysis

In one embodiment, techniques for cookies watermarking in malware analysis are disclosed. In an example implementation, watermark cookies refer to cookie files that have been pre-installed onto a clean virtual environment (e.g., malware analysis system 124 of cloud security service 122 as shown in FIG. 1). For example, these cookie files can be associated with one or more decoy accounts of well-known web sites, such as Facebook, Twitter, and/or various other popular or well-known web sites (e.g., see W.Xu, F.Zhang, and S.Zhu. Toward Worm Detection in Online Social Networks, ACSAC 2010 Proceedings of the 26th Annual Computer Security Applications Conference, pages 11-20).

In an example implementation, a script (e.g., a JavaScript script) can be executed to obtain user accounts at one or more web sites to obtain cookies that can be used as decoy, watermark cookies. These watermark cookies are then pre-installed onto a clean, instrumented virtual environment (e.g., customized an instrumented VM environment of the malware analysis system), and these watermark cookies support multiple different browsers, such as Google Chrome, Microsoft Internet Explorer, and Mozilla Firefox. Example pre-installed paths for each of these browsers is listed in Table 3 of FIG. 8.

In one embodiment, the altered, instrumented environment (e.g., in which these watermark cookies can be pre-installed onto a clean, instrumented virtual environment, such as by hot patching a VM instance executed in malware analysis system 124 of cloud security service 122 as shown in FIG. 1) is utilized to detonate (e.g., execute) samples and monitor their behaviors. If any of the watermark cookies (e.g., pre-installed cookie files) are detected as read, modified, and/or sent out (e.g., based on detecting the watermark cookie being sent in the pcap file during automated analysis of the sample based on a snippet for the watermark cookie generated using a custom Python component to generate file patterns for each watermark cookie to utilize as snippets for such detection techniques) by a given sample, then the sample can be deemed to be a malicious sample (e.g., classified as a malware sample with a high probability) as the sample was verified to conduct a behavior associated with unauthorized access, use, modification, and/or stealing of one or more user cookies.

Test Results of Malware Detection Using Watermark Cookies

In an example test of the above-described watermark-cookie-enabled environment, 600 random samples were selected for the test (e.g., this experiment/test was performed using 600 samples that were selected utilizing Wildfire's information previously gathered for these samples, in which each of the selected 600 samples was known to visit one or more social media domains based on previous monitoring analysis results of Wildfire). In this test, each of the samples was detonated in an altered, instrumented environment (e.g., in which these watermark cookies can be pre-installed onto a clean, instrumented virtual environment, such as malware analysis system 124 of cloud security service 122 as shown in FIG. 1). The behavior of each of the detonated malware samples can then be monitored for a period of time (e.g., 5 minutes or some other period of time or until a malicious behavior associated with the watermark cookies is detected). For example, the altered, instrumented environment can be configured to apply various watermark cookie detection rules (e.g., apply one or more watermark cookie detection rules, such as detection rules at the system-call level). In example implementation rules, the detection rules can include rules for detecting invalid/unauthorized file access or stealing of cookies (e.g., invalid/unauthorized file access/stealing cookies rules). In particular, if a watermark cookie (s) is inserted into the instrumented environment (e.g., a web site's cookies, such as for a social networking web site or another web site), then the monitored sample should not access the injected cookie file(s). As an example, if 20 different watermark cookies for 20 different web sites are injected into the instrumented environment, then the instrumented environment can be configured (e.g., with system-level detection rules) to monitor various system call(s) including any system call to open any of the injected cookies files (e.g., the parameter of the system call can include the filename of each inserted watermark cookie file, such that there would be 20 distinct system-call detection rules in this example for detecting any attempts to access (e.g., any attempt to read, modify, or send) any of the 20 inserted watermark cookie files).

In an example implementation, a detector component is provided for the instrumented virtual environment that can be configured to implement the above-described detection rules (e.g., the detector component can be written in the Python programming language and executed on an instrumented virtual machine (VM) environment of malware analysis system 124 as shown in FIG. 1). Next, the watermark cookie can be enabled and a new watermark cookie detection rule can be added as "invalid/unauthorized access to cookies' (e.g., 'stealing cookies'), such as similarly described above. In this test, the results showed that 14 of the 600 samples (or 2.3%) were found to have touched one or more of the watermark cookies (e.g., at least one of the pre-installed cookie files was read, modified, and/or sent out by each of these 14 samples). After checking with multiple online resources, each of these 14 samples were verified to be malicious, and their behaviors were missing in the initial environment set-up (e.g., in the initial instrumented environment set-up, these watermark cookies were not injected (and the "stealing cookies" detection rules were not implemented in this version of the initial instrumented environment set-up); hence, for certain malware (e.g., social bot), the initial instrumented environment set-up cannot detect such samples, but with injection of the watermark cookies and enabling the new watermark cookie detection rules, such malware can be detected using the above-described watermark cookie-based techniques).

A Watermark Cookies Illustration

FIG. 8 illustrates a table for locations for watermark cookies in accordance with some embodiments. In Table 3 as shown at 802 of FIG. 8, example locations (e.g., predetermined locations, such as in specific file directory paths) where the above-described watermark cookies can be injected for each browser are illustrated.

As discussed above, the above-described empirical studies of HTTP cookies in the context of malware and malicious traffic verify the efficacy of the disclosed techniques for malicious HTTP cookies detection and clustering and the efficacy of the disclosed techniques for cookies watermarking in malware analysis. Given that the HTTP cookie header is commonly used as an authentication token or session status indicator, the disclosed techniques and empirical studies verify that malicious cookies also can contain such information. The above-described findings also show that malware follows the same rules as normal traffic (e.g., benign traffic).

In addition, identity and status information has also been shown to be embedded in cookies for some malware families as described above. As a result, such identity and status information can be used for generating signatures for malicious cookies and, thus, malware associated with such malicious cookies as described above.

Furthermore, techniques for applying a cluster-based malicious cookie detection are described above. These techniques can be performed based on an analysis of attributes (e.g., text attributes) of malicious cookies. The above-described evaluation results show that the disclosed clustered-based techniques can effectively detect malicious cookies.

Finally, the above-described watermark cookie techniques are also shown to enhance existing malware analysis environments to detect cookie stealing behaviors as described above.

An example component diagram of a system for performing the disclosed techniques for malicious HTTP cookies detection and clustering will now be described.

Figure 9:
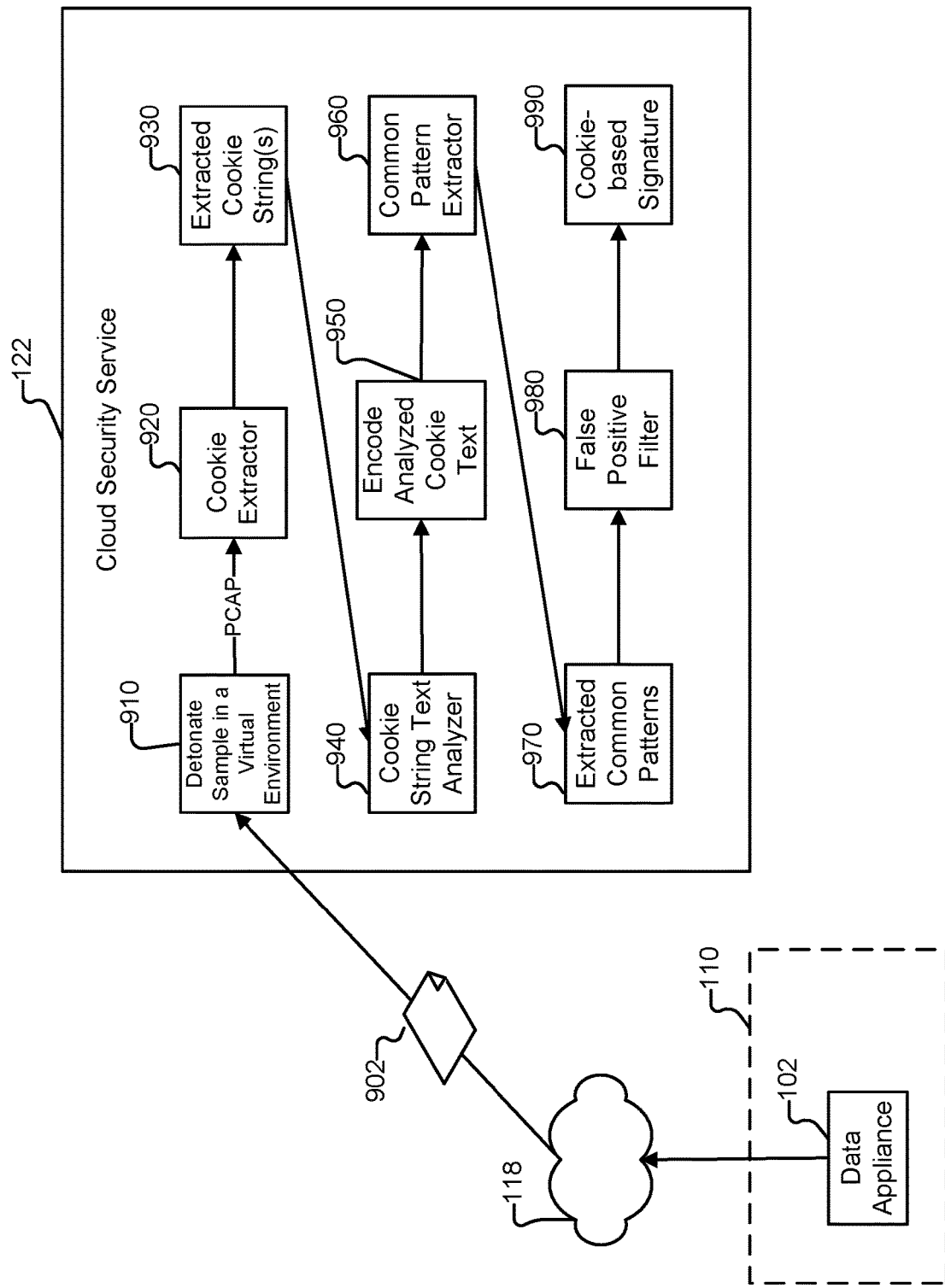
FIG. 9 is a component diagram of a system that can perform the disclosed techniques for malicious HTTP cookies detection and clustering in accordance with some embodiments.

Example Components of a System for Malicious HTTP Cookies Detection and Clustering FIG. 9 is a component diagram of a system that can perform the disclosed techniques for malicious HTTP cookies detection and clustering in accordance with some embodiments. In an example implementation, cloud security service 122 including malware analysis system 124 and cookies signature generator 126 of FIG. 1 can be implemented using the components as shown in FIG. 9 as further described below.

At 910, a sample 902 is received from a data appliance 102 for enterprise network 110 via Internet 118 and detonated in a virtual, instrumented environment, such as malware analysis system 124 of cloud security service 122 as similarly described above with respect to FIG. 1. For example, the detonated sample can then be monitored using the virtual, instrumented environment, which can include generating a packet capture (pcap) file(s) (e.g., the pcap file(s) stores network traffic data generated during emulation of the malware sample using malware analysis system 124 as shown in FIG. 1) based on monitored network activities during the monitoring of the detonated sample (e.g., the sample activities can be monitored for a predetermined period of time, such as 5 minutes or another period of time, or until a predetermined event(s) is detected) that can be provided to a cookie extractor component as described below.

At 920, a cookie extractor component extracts HTTP cookies and associated cookie strings from a packet capture (pcap) file(s) for sample 902. The extracted cookie strings are output at 930. For example, the HTTP cookie extractor component can be implemented using a libpkt open source component/tool to analyze the packets (e.g., a number of different supported network protocols, including HTTP network traffic), and a Python component (e.g., a custom component written in the Python programming language) to extract cookies from HTTP headers from the HTTP packets (e.g., implementing a string pattern matching function to identify cookies in the HTTP headers).

At 940, a cookie string text analyzer component processes extracted cookie strings 930 to provide the following: (1) split key/value pairs; (2) identify a type of key/value (e.g., upper/lower case letters, etc.); and (3) calculate an entropy of the key/value pairs. For example, the splitting key/value pairs and identifying a type of key/value can be implemented using a Python component (e.g., a custom component written in the Python programming language), and the entropy calculation performed by the cookie string text analyzer can be implemented using an existing Python open source library called PyEntropy to implement the calculation of the entropy.

At 950, analyzed cookie string text includes an indication of whether the cookie string text was determined to be randomly generated or not (e.g., based on the above-described entropy calculation), and then the analyzed cookie string text is input to an encoding function to generate 0-1 strings (e.g., 0 if random; and if not random, then 1 and then generates an encoding based on identified patterns for each of the extracted cookie strings as similarly described above). For example, the encoding of analyzed cookie text can encode the analyzed cookie strings (e.g., for not random cookie strings) with text labels, such as similarly described above with respect to Table 1 of FIG. 6A. In an example implementation, the encode analyzed cookie text component can be implemented using a custom component written in the Python programming language.

At 960, a common pattern extractor component determines common subsets of strings among the cookies to extract common patterns output at 970. For example, the common pattern extractor component can be implemented using a Python component (e.g., a custom component written in the Python programming language to provide an implementation of the well-known longest common subsequence (LCS) algorithm for finding the longest subsequence common to all sequences in a set of sequences, such as generally described at https://en.wikipedia.org/wiki/Longest_common_subsequence_problem).

At 980, a false positive filter component compares the extracted common patterns (970) with legitimate cookie patterns (e.g., similarly extracted common patterns from cookies previously determined to be benign, non-malicious cookies, that is, cookies associated with benign, non-malicious network traffic/activities) to determine whether the extracted common patterns are also associated with cookies found in benign network traffic based on a threshold value (e.g., 5% or some other threshold value for false positives) (e.g., apply a similar process to benign verdict samples, and if 5% of the benign samples match the cookie signature (extracted common patterns), then disregard as too high false positive rate). If the false positive filter comparison does not exceed the threshold value, then a cookie-based signature is automatically generated at 990 (e.g., the cookie-based signature can be automatically generated based on the extracted common patterns (970)). Otherwise (e.g., the false positive comparison exceeded the threshold value), a new cookie-based signature is not generated using the extracted common patterns (970). For example, the generated cookie-based signatures can then be applied by cloud security service 122 and/or sent to data appliance 102 (e.g., and/or sent to host agents, such as HA 114 as shown in FIG. 1) for applying locally on enterprise network 110 to automatically detect malware on an infected machine and/or malicious activity in network traffic as similarly described above.

Whenever cloud security service 122 is described as performing a task, a single component, a subset of components, or all components of cloud security service 122 may cooperate to perform the task. Similarly, whenever a component of cloud security service 122 is described as performing a task, a subcomponent may perform the task and/or the component may perform the task in conjunction with other components. Similarly, additional logical components/features can be added to cloud security service 122 as applicable.

Additional example processes for the disclosed techniques for malicious HTTP cookies detection and clustering will now be described.

Processes for Malicious HTTP Cookies Detection and Clustering

Figure 10:
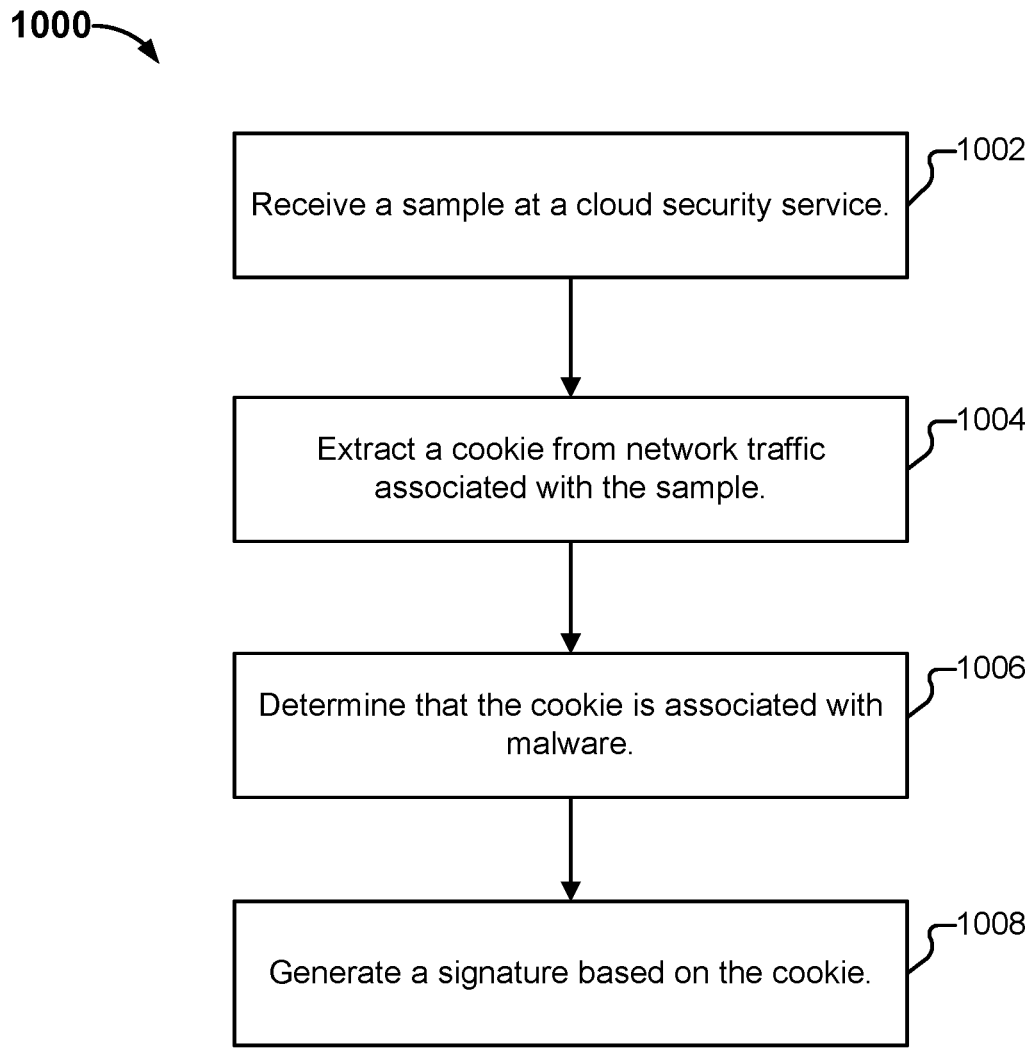
FIG. 10 is a flow diagram of a process for malicious HTTP cookies detection and clustering in accordance with some embodiments.

FIG. 10 is a flow diagram of a process for malicious HTTP cookies detection and clustering in accordance with some embodiments. In some embodiments, a process 1000 as shown in FIG. 10 is performed by the platform and techniques as similarly described above including the embodiments described above with respect to FIGS. 1-3, 5-7, and 9. In one embodiment, process 1000 is performed by cloud security service 122 as described above with respect to FIGS. 1-3, 5-7, and 9.

The process begins at 1002 when a sample is received at a cloud security service. For example, a sample can be received from a subscribing data appliance as similarly described above with respect to FIGS. 1 and 9.

At 1004, a cookie is extracted from network traffic associated with the sample. For example, the sample can be detonated and its activities monitored using a malware analysis system as similarly described above with respect to FIGS. 1 and 9.

At 1006, the cookie is determined to be associated with malware. For example, the cookie can be verified as being associated with known malware using a clustering-based approach and/or a content-based approach as similarly described above.

At 1008, a signature is generated based on the cookie. For example, unique data (e.g., unique sets of strings/text in the cookie) can be utilized to generate a cookie-based signature as similarly described above with respect to FIG. 9.

Figure 11:
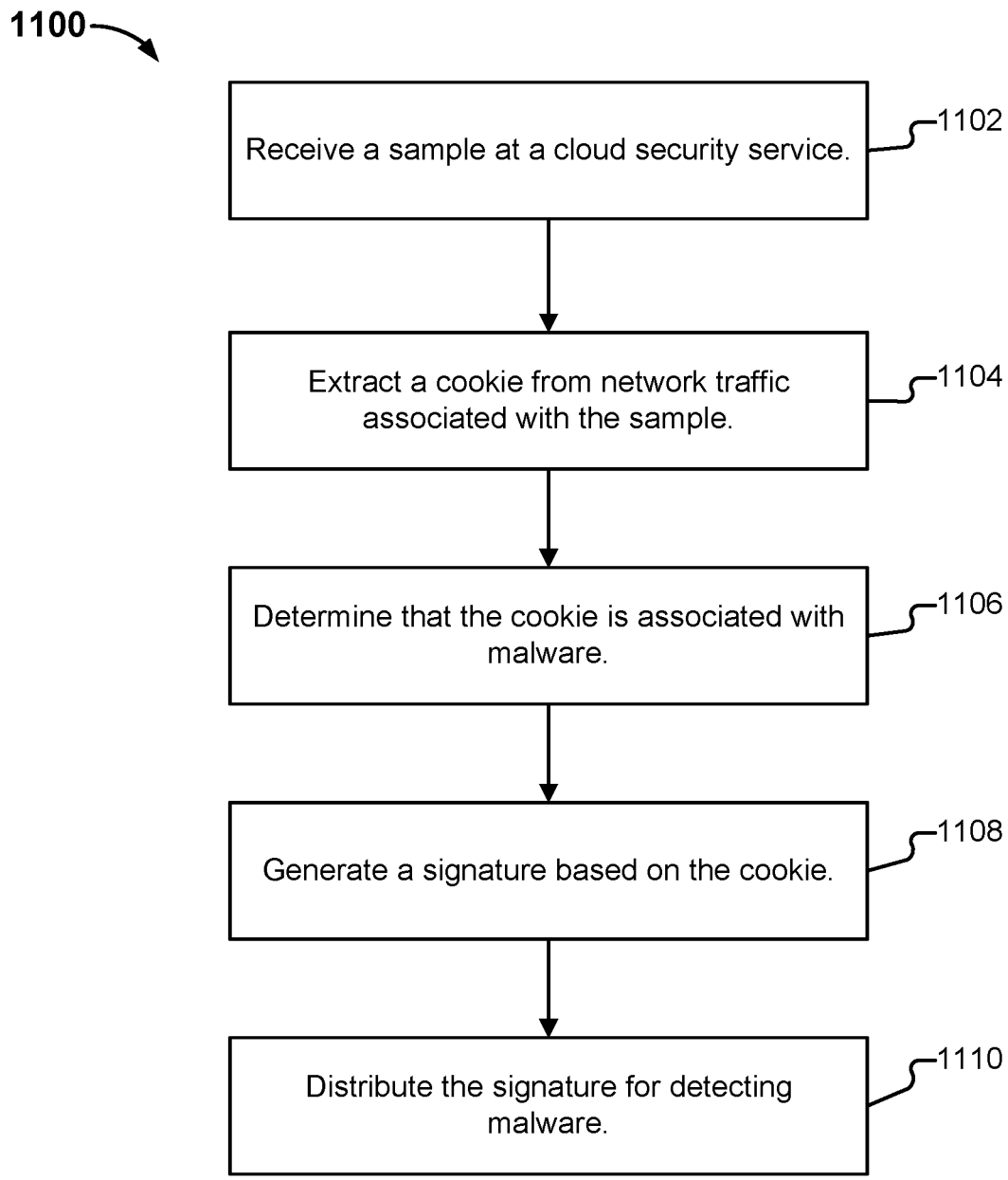
FIG. 11 is another flow diagram of a process for malicious HTTP cookies detection and clustering in accordance with some embodiments.

FIG. 11 is another flow diagram of a process for malicious HTTP cookies detection and clustering in accordance with some embodiments. In some embodiments, a process 1100 as shown in FIG. 11 is performed by the platform and techniques as similarly described above including the embodiments described above with respect to FIGS. 1-3, 5-7, and 9. In one embodiment, process 1100 is performed by cloud security service 122 as described above with respect to FIGS. 1-3, 5-7, and 9.

The process begins at 1102 when a sample is received at a cloud security service. For example, a sample can be received from a subscribing data appliance as similarly described above with respect to FIGS. 1 and 9.

At 1104, a cookie is extracted from network traffic associated with the sample. For example, the sample can be detonated and its activities monitored using a malware analysis system as similarly described above with respect to FIGS. 1 and 9.

At 1106, the cookie is determined to be associated with malware. For example, the cookie can be verified as being associated with known malware as similarly described above.

At 1108, a signature is generated based on the cookie. For example, unique data (e.g., unique sets of strings/text in the cookie) can be utilized to generate a cookie-based signature as similarly described above with respect to FIG. 9.

At 1110, the signature is distributed for detecting malware. For example, a signature can be sent (e.g., pushed as an update) from the cloud security service to a subscribing data appliance or HA, which can then implement the signature to detect malware as similarly described above.

Figure 12:
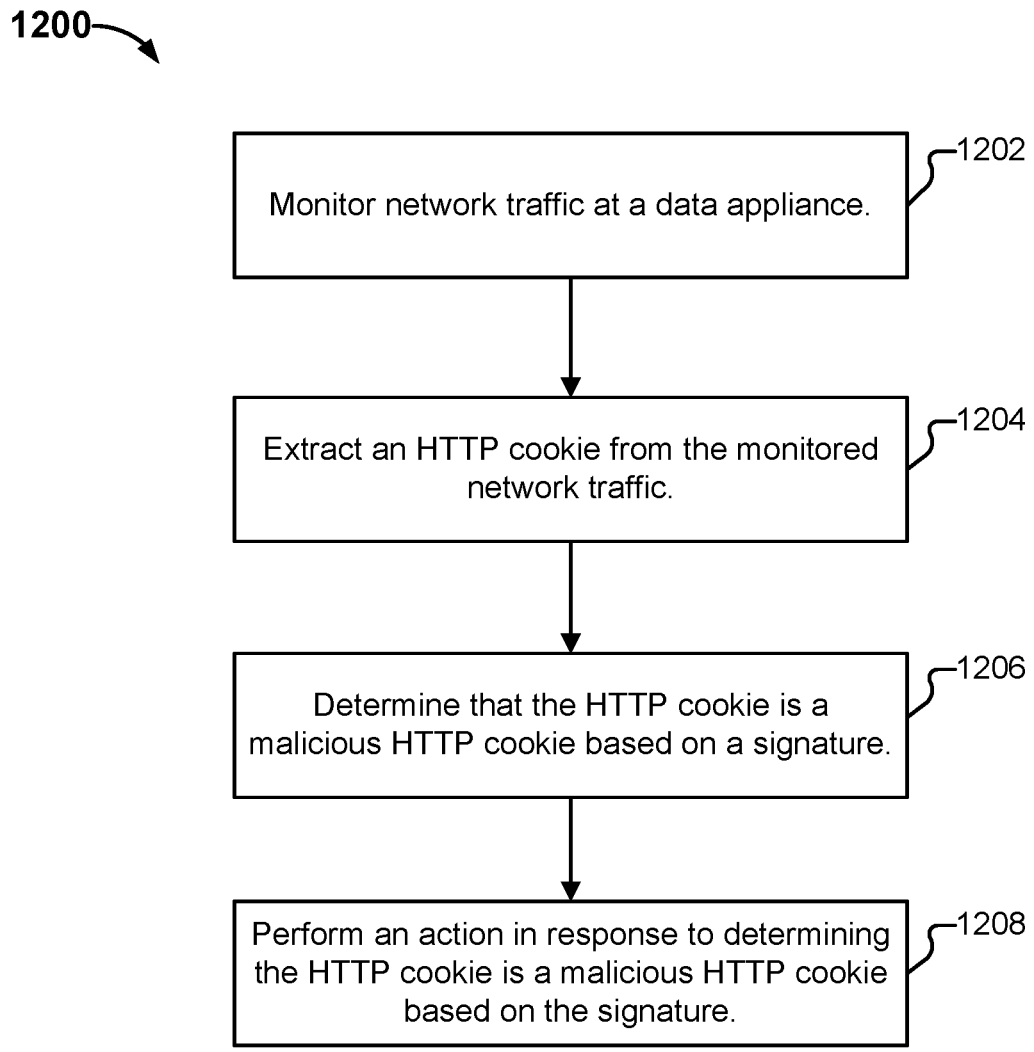
FIG. 12 is another flow diagram of a process for malicious HTTP cookies detection and clustering in accordance with some embodiments.

FIG. 12 is another flow diagram of a process for malicious HTTP cookies detection and clustering in accordance with some embodiments. In some embodiments, a process 1200 as shown in FIG. 12 is performed by the platform and techniques as similarly described above including the embodiments described above with respect to FIGS. 1-3, 5-7, and 9. In one embodiment, process 1200 is performed by data appliance 102 (e.g., or can similarly be performed by HA 114 as shown in FIG. 1) as described above with respect to FIGS. 1-3, 5-7, and 9.

The process begins at 1202 when network traffic is monitored at a data appliance. For example, a data appliance can monitor network traffic as similarly described above with respect to FIGS. 1-3.

At 1204, an HTTP cookie is extracted from the monitored network traffic. For example, the HTTP cookie can be extracted from the monitored network traffic as similarly described above (e.g., based on HTTP header information in HTTP traffic).

At 1206, the HTTP cookie is determined to be a malicious HTTP cookie based on a signature. For example, the signature can be a cookie-based signature that is generated using the techniques described above with respect to FIG. 9.

At 1208, an action is performed in response to determining that the HTTP cookie is a malicious HTTP cookie based on the signature. For example, the data appliance can block the network/HTTP traffic, or perform some other measure/response, such as alert, block, drop, log, quarantine, and/or some other measure/response or combination thereof can be performed.

An example component diagram of a system for performing the disclosed techniques for cookies watermarking in malware analysis will now be described.

Example Components of a System for Cookies Watermarking in Malware Analysis

Figure 13:
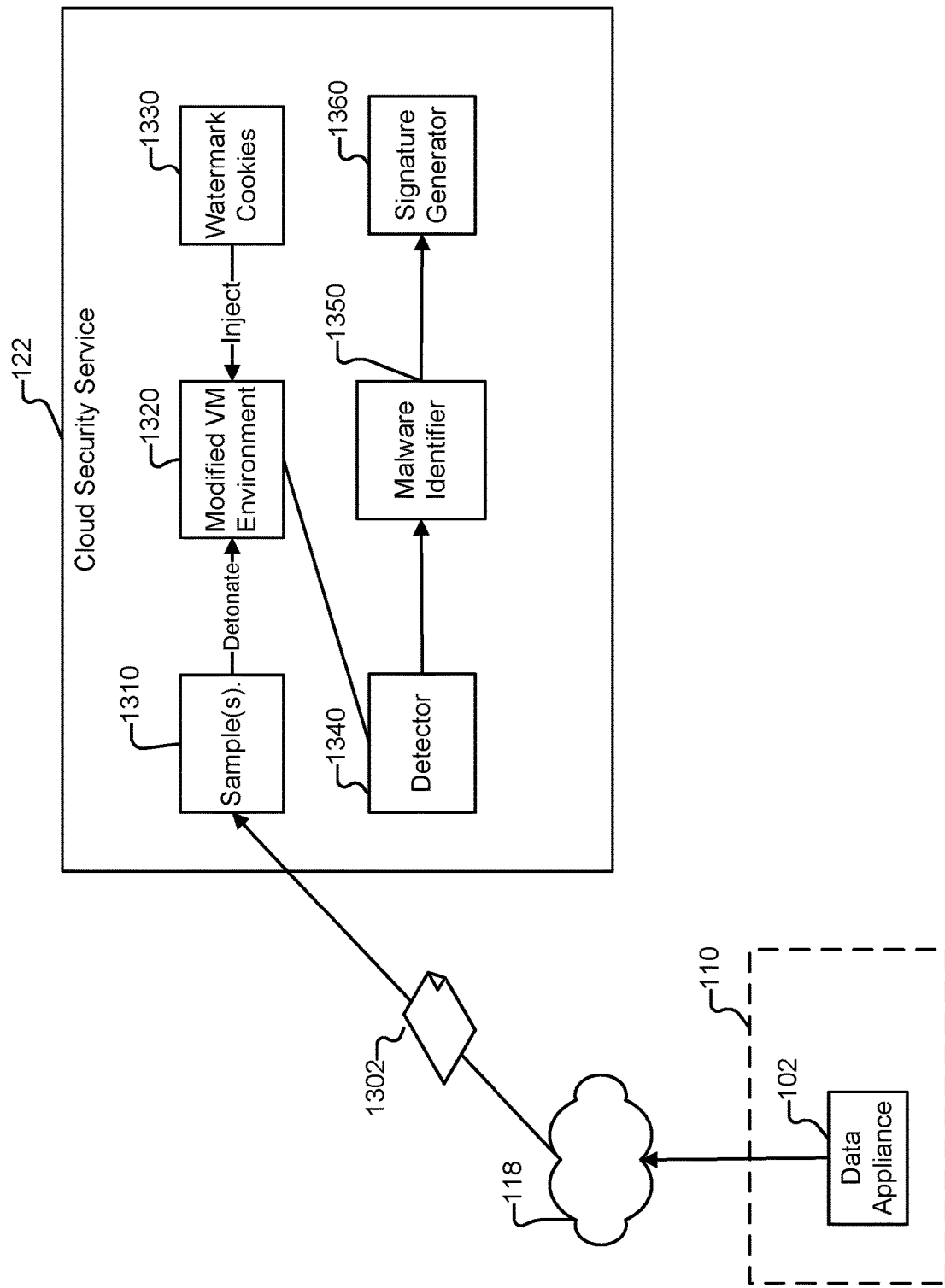
FIG. 13 is a component diagram of a system that can perform the disclosed techniques for cookies watermarking in malware analysis in accordance with some embodiments.

FIG. 13 is a component diagram of a system that can perform the disclosed techniques for cookies watermarking in malware analysis in accordance with some embodiments. In an example implementation, cloud security service 122 including malware analysis system 124 and malware analysis system 124 of FIG. 1 can be implemented using the components as shown in FIG. 13 as further described below.

At 1310, a sample 1302 is received and stored in a sample data store 1310 at cloud security service 122 from a data appliance 102 for enterprise network 110 via Internet 118. Watermark cookies as shown at 1330 are injected in a clean, virtual environment (e.g., storing the watermark cookie files in file directory paths as shown in Table 3 of FIG. 8) to generate a modified VM environment as shown at 1320 as similarly described above. The sample stored at 1310 is then detonated in the modified VM environment 1320 and its behaviors during an automated malware analysis (e.g., using malware analysis system 124) are monitored using a detector component 1340 as similarly described above. If one or more of the watermark cookies are detected as having been accessed, modified, and/or sent during the monitored malware analysis of the sample, then the sample is identified as being malware at 1350 as similarly described above. At 1360, a signature is generated using an automated signature generation component (e.g., to extract one or more unique strings or other attributes associated with the malware sample to generate the signature for identifying that malware). For example, the signature can be distributed to subscribing data appliances and/or HAs as similarly described above.

Additional example processes for the disclosed techniques for cookies watermarking in malware analysis will now be described.

Processes for Cookies Watermarking in Malware Analysis

Figure 14:
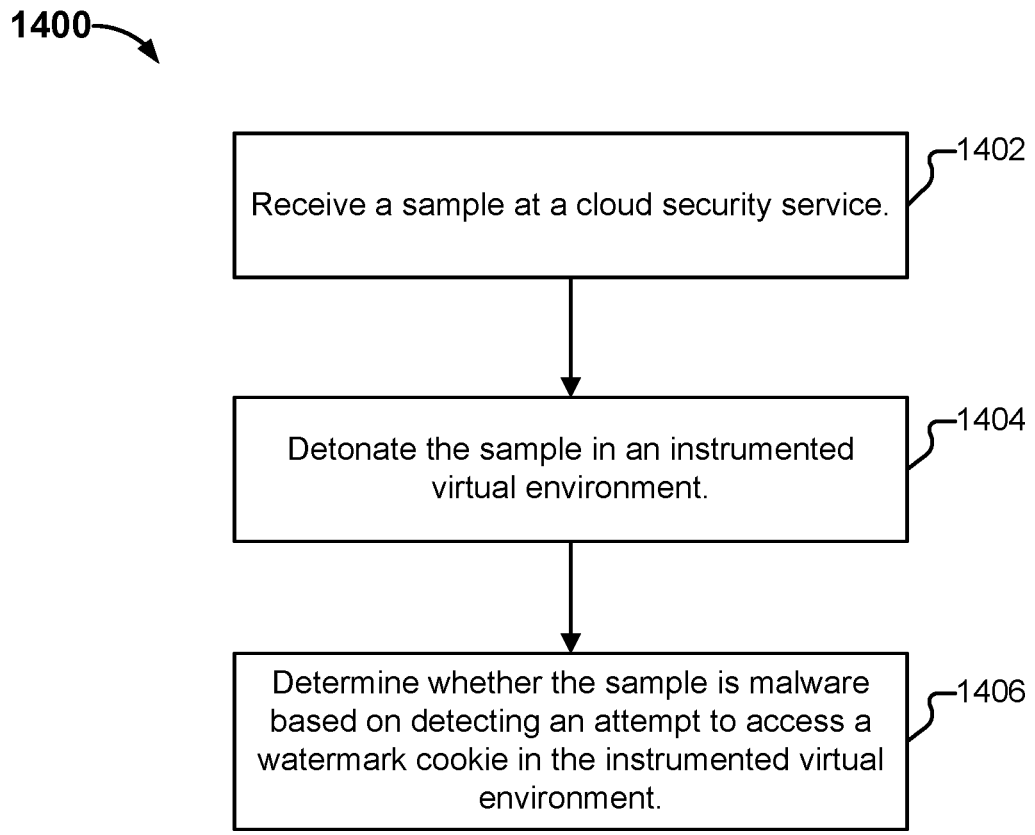
FIG. 14 is a flow diagram of a process for cookies watermarking in malware analysis in accordance with some embodiments.

FIG. 14 is a flow diagram of a process for cookies watermarking in malware analysis in accordance with some embodiments. In some embodiments, a process 1400 as shown in FIG. 14 is performed by the platform and techniques as similarly described above including the embodiments described above with respect to FIGS. 1-3, 8, and 13. In one embodiment, process 1400 is performed by cloud security service 122 as described above with respect to FIGS. 1-3, 8, and 13.

The process begins at 1402 when a sample is received at a cloud security service. For example, a sample can be received from a subscribing data appliance as similarly described above with respect to FIGS. 1 and 13.

At 1404, the sample is detonated in an instrumented virtual environment. For example, the sample can be executed or opened in the instrumented virtual environment to facilitate an automated malware analysis of the sample to monitor activities/behaviors of the sample for a predetermined period of time as similarly described above.

At 1406, whether the sample is malware (e.g., malicious) is determined based on detecting an attempt to access a watermark cookie in the instrumented virtual environment. For example, if the watermark cookie was accessed, modified, or sent, then the sample is identified as malware as similarly described above with respect to FIG. 13.

Figure 15:
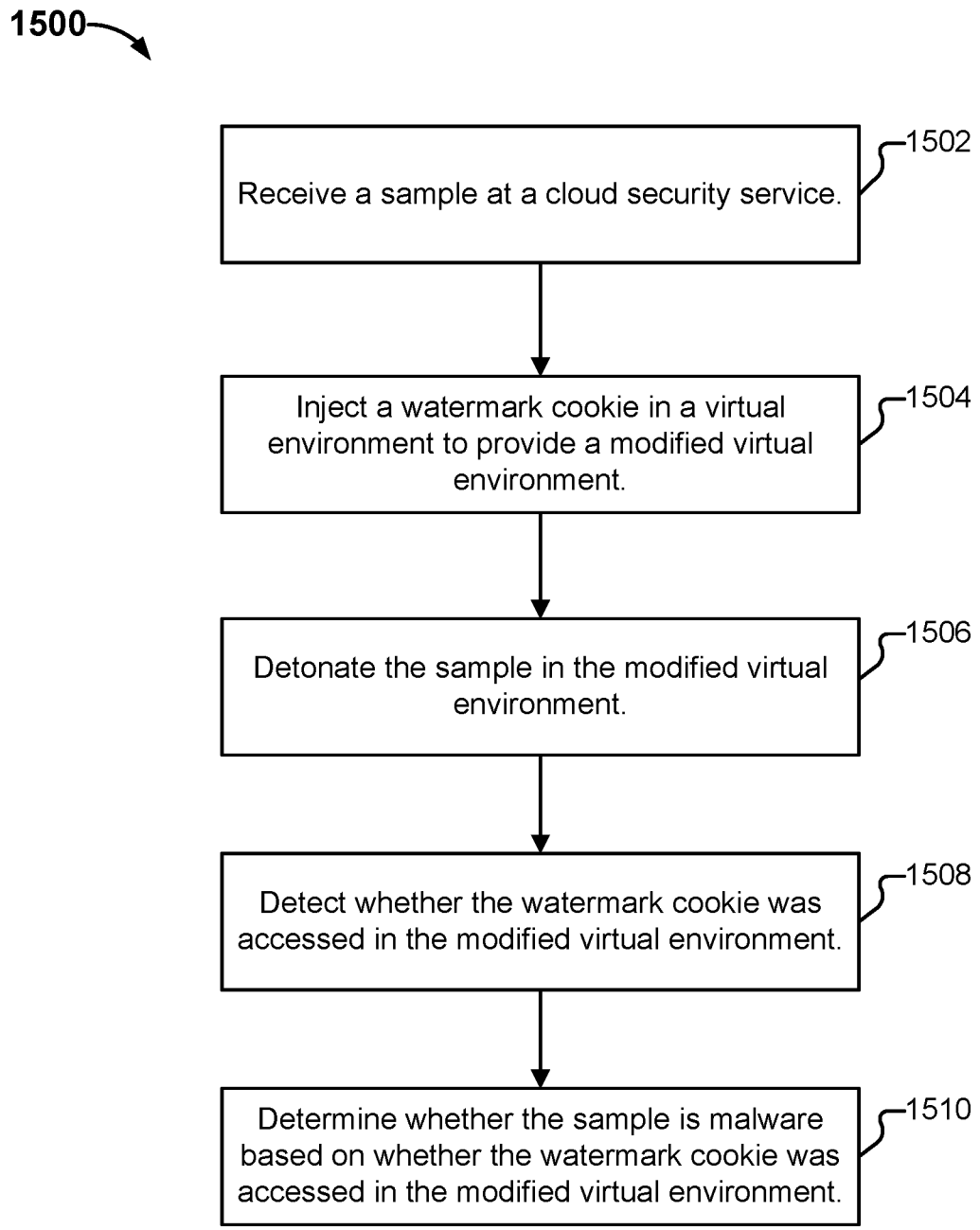
FIG. 15 is another flow diagram of a process for cookies watermarking in malware analysis in accordance with some embodiments.

FIG. 15 is another flow diagram of a process for cookies watermarking in malware analysis in accordance with some embodiments. In some embodiments, a process 1500 as shown in FIG. 15 is performed by the platform and techniques as similarly described above including the embodiments described above with respect to FIGS. 1-3, 8, and 13. In one embodiment, process 1500 is performed by cloud security service 122 as described above with respect to FIGS. 1-3, 8, and 13.

The process begins at 1502 when a sample is received at a cloud security service. For example, a sample can be received from a subscribing data appliance as similarly described above with respect to FIGS. 1 and 13.

At 1504, a watermark cookie is injected in a virtual environment to provide a modified virtual environment. For example, the watermark cookie can be stored in a predetermined file directory path for one or more web browsers in a modified virtual environment that is instrumented as similarly described above.

At 1506, the sample is detonated in the modified virtual environment. For example, the sample can be executed or opened in the modified virtual environment to facilitate an automated malware analysis of the sample to monitor activities/behaviors of the sample for a predetermined period of time as similarly described above.

At 1508, whether the watermark cookie was accessed in the modified virtual environment is detected.

At 1510, whether the sample is malware (e.g., malicious) is determined based on whether the watermark cookie was accessed in the modified virtual environment. For example, if the watermark cookie was accessed, modified, or sent, then the sample is identified as malware as similarly described above with respect to FIG. 13. Also, if the sample is determined to be malware, then a signature can be generated for the malware sample as similarly described above.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:
1. A system, comprising:
a processor configured to:
receive a sample at a cloud security service;
inject a watermark cookie in a virtual environment to provide a modified virtual environment;
detonate the sample in the modified virtual environment, wherein the modified virtual environment is instrumented for monitoring activities associated with the sample during automated malware analysis of the sample;
detect whether the watermark cookie was accessed in the modified virtual environment during the automated malware analysis of the sample; and
determine whether the sample is malware based on whether the watermark cookie was accessed in the modified virtual environment; and
a memory coupled to the processor and configured to provide the processor with instructions.
2. The system recited in claim 1, wherein the cookie is an HTTP cookie.

3. The system recited in claim 1, wherein the cookie is an HTTP cookie that is associated with one or more decoy accounts of a web site.

4. The system recited in claim 1, wherein the processor is further configured to:
detect whether the watermark cookie was opened, modified, or sent in the modified virtual environment during the automated malware analysis of the sample.

5. The system recited in claim 1, wherein the processor is further configured to:
automatically generate a signature for the sample if the sample is determined to be malware.

6. The system recited in claim 1, wherein the processor is further configured to
pre-install the watermark cookie in the virtual environment.

7. The system recited in claim 1, wherein the processor is further configured to:
pre-install the watermark cookie in the virtual environment, wherein the watermark cookie supports a plurality of web browsers by using distinct pre-installed paths for each of the plurality of web browsers.

8. A method, comprising:
receiving a sample at a cloud security service;
injecting a watermark cookie in a virtual environment to provide a modified virtual environment;
detonating the sample in the modified virtual environment, wherein the modified virtual environment is instrumented for monitoring activities associated with the sample during automated malware analysis of the sample;
detecting whether the watermark cookie was accessed in the modified virtual environment during the automated malware analysis of the sample; and
determining whether the sample is malware based on whether the watermark cookie was accessed in the modified virtual environment.

9. The method of claim 8, wherein the cookie is an HTTP cookie.

10. The method of claim 8, wherein the cookie is an HTTP cookie that is associated with one or more decoy accounts of a web site.

11. The method of claim 8, further comprising:
detecting whether the watermark cookie was opened, modified, or sent in the modified virtual environment during the automated malware analysis of the sample.

12. The method of claim 8, further comprising:
automatically generating a signature for the sample if the sample is determined to be malware.

13. The method of claim 8, further comprising:
pre-installing the watermark cookie in the virtual environment.

14. The method of claim 8, further comprising:
pre-installing the watermark cookie in the virtual environment, wherein the watermark cookie supports a plurality of web browsers by using distinct pre-installed paths for each of the plurality of web browsers.

15. A computer program product, the computer program product being embodied in a non-transitory, tangible computer readable storage medium and comprising computer instructions for:
receiving a sample at a cloud security service;
injecting a watermark cookie in a virtual environment to provide a modified virtual environment;
detonating the sample in the modified virtual environment, wherein the modified virtual environment is instrumented for monitoring activities associated with the sample during automated malware analysis of the sample;
detecting whether the watermark cookie was accessed in the modified virtual environment during the automated malware analysis of the sample; and
determining whether the sample is malware based on whether the watermark cookie was accessed in the modified virtual environment.

16. The computer program product recited in claim 15, wherein the cookie is an HTTP cookie that is associated with one or more decoy accounts of a web site.

17. The computer program product recited in claim 15, further comprising computer instructions for:
detect whether the watermark cookie was opened, modified, or sent in the modified virtual environment during the automated malware analysis of the sample.

18. The computer program product recited in claim 15, further comprising computer instructions for:
automatically generating a signature for the sample if the sample is determined to be malware.

19. The computer program product recited in claim 15, further comprising computer instructions for:
pre-installing the watermark cookie in the virtual environment.

20. The computer program product recited in claim 15, further comprising computer instructions for:
pre-installing the watermark cookie in the virtual environment, wherein the watermark cookie supports a plurality of web browsers by using distinct pre-installed paths for each of the plurality of web browsers.

* * * * *